US012749180B2

(12) United States Patent
Brickman et al.

(10) Patent No.: US 12,749,180 B2
(45) Date of Patent: Sep. 29, 2026

(54) SYSTEMS AND METHODS FOR THE AUTOMATED DETECTION OF CEREBRAL MICROBLEEDS USING 3T MRI

(71) Applicant: THE TRUSTEES OF COLUMBIA UNIVERSITY IN THE CITY OF NEW YORK, New York, NY (US)

(72) Inventors: Adam M. Brickman, Ardsley, NY (US); Anthony G. Chesebro, Port Jefferson, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 205 days.

(21) Appl. No.: 18/110,535

(22) Filed: Feb. 16, 2023

(65) Prior Publication Data

US 2023/0298170 A1 Sep. 21, 2023

Related U.S. Application Data

(60) Provisional application No. 63/310,767, filed on Feb. 16, 2022.

(51) Int. Cl.
*G06T 7/00* (2017.01)
*G06T 7/13* (2017.01)
(Continued)

(52) U.S. Cl.
CPC .............. *G06T 7/0012* (2013.01); *G06T 7/13* (2017.01); *G06T 7/136* (2017.01); *G06T 7/168* (2017.01);
(Continued)

(58) Field of Classification Search
CPC ......... G06T 7/0012; G06T 7/13; G06T 7/136; G06T 7/168; G06T 7/337; G06T 7/74;
(Continued)

(56) References Cited

U.S. PATENT DOCUMENTS 7,660,453 B2 * 2/2010 Lang .................... G06T 7/0012 382/128
10,275,680 B2 * 4/2019 Zach .................... G06T 7/0012
(Continued)

OTHER PUBLICATIONS

Chesebro, A.G., Amarante, E., Lao, P.J. et al. Automated detection of cerebral microbleeds on T2-weighted MRI. Sci Rep 11, 4004 (2021). https://doi.org/10.1038/s41598-021-83607-0 (Year: 2021).*
(Continued)

*Primary Examiner* — Gregory A Morse
*Assistant Examiner* — Ronde Lee Miller
(74) *Attorney, Agent, or Firm* — Barclay Damon LLP; Anthony P. Gangemi

(57) ABSTRACT

Automated cerebral microbleed detection is performed in extracted T2*-weighted image data, including gradient echo (GRE) image data and susceptibility-weighted imaging (SWI) image data. The image data is resampled and potential 2D regions of interest (ROI) having a circular or ellipsoidal shape are identified based in part on a respective intensity of associated resampled image pixels. The number of 2D ROIs are reduced by size, edge, and/or cerebrospinal fluid (CSF) mask exclusion, and then merged to form 3D ROIs. False positive 3D ROIs are removed and the remaining ROIs stored for review by a trained rater. The embodiments of the present disclosure outperform visual ratings of cerebral microbleeds, reducing the time to visually rate the scans while retaining sensitivity to the microbleeds themselves. These embodiments also exhibit higher sensitivity in longitudinal identification of microbleed locations, and are suited to longitudinal examination of cerebrovascular disease, e.g., Alzheimer's in adults with Down syndrome.

20 Claims, 10 Drawing Sheets

(51) Int. Cl.

| | |
|---|---|
| ***G06T 7/136*** | (2017.01) |
| ***G06T 7/168*** | (2017.01) |
| ***G06T 7/33*** | (2017.01) |
| ***G06T 7/73*** | (2017.01) |
| ***G06V 10/25*** | (2022.01) |

(52) U.S. Cl.
CPC ................ *G06T 7/337* (2017.01); *G06T 7/74* (2017.01); *G06V 10/25* (2022.01); *G06T 2207/10088* (2013.01); *G06T 2207/20061* (2013.01); *G06T 2207/20221* (2013.01); *G06T 2207/30016* (2013.01); *G06T 2207/30104* (2013.01)

(58) Field of Classification Search
CPC . G06T 2207/10088; G06T 2207/20061; G06T 2207/20221; G06T 2207/30016; G06T 2207/30104; G06V 10/25; G06V 2201/03
See application file for complete search history.

(56) References Cited

U.S. PATENT DOCUMENTS

| | | | | |
|---|---|---|---|---|
| 10,410,344 | B2 * | 9/2019 | Alsop | G06T 5/50 |
| 11,282,193 | B2 * | 3/2022 | Harrison | G06V 10/764 |
| 11,430,119 | B2 * | 8/2022 | Bhatia | G06V 10/764 |
| 11,461,990 | B2 * | 10/2022 | Xiang | G06T 7/136 |
| 11,701,024 | B2 * | 7/2023 | Shirai | G06V 10/25 600/419 |
| 2015/0208994 | A1 * | 7/2015 | Rapoport | A61B 6/4417 600/411 |
| 2017/0258420 | A1 * | 9/2017 | Inglese | G16H 50/30 |
| 2019/0012783 | A1 * | 1/2019 | Zahid | G06T 7/155 |
| 2020/0005463 | A1 * | 1/2020 | Wu | G06T 7/149 |
| 2020/0167930 | A1 * | 5/2020 | Wang | G06N 3/08 |
| 2020/0272841 | A1 * | 8/2020 | Han | G06T 7/0012 |
| 2023/0281822 | A1 * | 9/2023 | Lee | A61B 6/5258 |
| 2023/0298170 | A1 * | 9/2023 | Brickman | G06T 7/13 382/131 |
| 2024/0070857 | A1 * | 2/2024 | Zhang | G06T 7/136 |
| 2024/0315655 | A1 * | 9/2024 | Siemionow | A61B 6/5217 |

OTHER PUBLICATIONS

Park, SH., Lim, H., Bae, B.K. et al. Robustness of magnetic resonance radiomic features to pixel size resampling and interpolation in patients with cervical cancer. Cancer Imaging 21, 19 (2021). https://doi.org/10.1186/s40644-021-00388-5 (Year: 2021).*

Kuijf, H.J., et al., "Semi-Automated Detection of Cerebral Microbleeds on 3.0 T MR Images," PLoS One, vol. 8, Issue 6, pp. 1-6, Jun. 2013.

Zahid, A.B., et al., "Accelerated Brain Atrophy on Serial Computed Tomography: Potential Marker of the Progression of Alzheimer's Disease," Journal of Computer Assisted Tomography, vol. 40, Issue 5, pp. 827-832, Sep. 2016.

Dou, Q., et al., "Automatic Detection of Cerebral Microbleeds From MR Images via 3D Convolutional Neural Networks," IEEE Transactions on Medical Imaging, vol. 35, Issue 5, pp. 1182-1195, May 2016.

Kamnitsas, K., et al., "Efficient multi-scale 3D CNN with fully connected CRF for accurate brain lesion segmentation," Medical Image Analysis, vol. 36, pp. 61-78, 2017.

Kuijf, H.J., et al., "Efficient detection of cerebral microbleeds on 7.0 T MR images using the radial symmetry transform," NeuroImage, vol. 59, Issue 3, pp. 2266-2273, 2012.

Chen, H., et al., "VoxResNet: Deep voxelwiseresidual networks for brain segmentation from 3D MR images," NeuroImage, vol. 170, pp. 446-455, 2018.

* cited by examiner

SYSTEMS AND METHODS FOR THE AUTOMATED DETECTION OF CEREBRAL MICROBLEEDS USING 3T MRI

CROSS REFERENCE TO RELATED APPLICATION(S)

This application claims the benefit of U.S. Provisional Application No. 63/310,767, filed Feb. 16, 2022, which is incorporated by reference as if disclosed herein in its entirety.

STATEMENT ON FEDERALLY SPONSORED RESEARCH OR DEVELOPMENT

This invention was made with Government support under AG034189 and AG066462 awarded by the National Institutes of Health. The Government has certain rights in the invention.

BACKGROUND

Microhemorrhages in the brain, known as cerebral microbleeds, are small, persistent deposits of products from blood breakdown, primarily hemosiderin, which have been contained in perivascular regions by macrophages. The current gold standard for detecting and rating cerebral microbleeds in a research context is visual inspection by trained raters, a process that is both time consuming and subject to poor reliability.

Radiologically, microbleeds are identified on T2*-weighted magnetic resonance imaging (MRI) scans, e.g., gradient-recall echo (GRE) or susceptibility-weighed (SWI) scans, as roughly spherical signal voids, or hypointensities, due to the strong paramagnetic properties of the hemosiderin left after a bleed has occurred. Cerebral microbleeds are associated with a number of outcomes, such as small vessel disease, stroke, traumatic brain injury, radiation-induced bleeding, cognitive decline, and vascular dementia. Lobar distributions of cerebral microbleeds are considered markers of cerebral amyloid angiopathy, and are a prominent feature of Alzheimer's disease (AD). In addition to signaling vascular forms of amyloid pathology, particularly in AD, microbleeds have emerged as a pernicious side effect of anti-amyloid treatments, so-called amyloid related imaging abnormalities related to hemosiderin deposits (ARIA-H), a consideration in the enrollment of participants into AD therapeutic trials. Although microbleeds can be present asymptomatically, early detection can be crucial in estimating risk for later cerebrovascular disease and cognitive decline.

As discussed above, microbleeds are detected radiologically with T2*-weighted MRI images, including either GRE or SWI scans. These radiological findings have been validated post-mortem, with true positives captured on imaging 48%-89% of the time, depending on acquisition parameters. Given the high level of sensitivity of MRI to paramagnetic material and the small size of the deposits, it is possible that MRI is more sensitive than gross pathological examination. By omitting a refocusing pulse used in spin-echo sequences (such as T1) to correct of susceptibility distortion, GRE MRI is sensitive to paramagnetic artifacts, which can be exploited to visualize cerebral microbleeds. SWI MRI is an alternative, more sensitive imaging modality for microbleed detection, with a larger "blooming" effect of paramagnetic material, making microbleeds more easily visible but also potentially more irregularly shaped.

As mentioned above, visual inspection of the T2*MRI scans for small, ovoid, hypointense regions indicative of microbleeds is the most frequently used method of rating microbleeds. Several methods have been developed to improve interrater reliability and reduce the subjectivity inherent in visual reads. With increased research and clinical interest in microbleeds, particularly with respect to ARIA-H, there is a need for standardized automated or semi-automated pipelines to detect cerebral microbleeds. A few methods have been proposed, however, these studies are frequently done in small clinical populations, e.g., patients with radiation-induced microbleeds or traumatic brain injury, with much higher rates of microbleeds than in community-based adults, and have not demonstrated generalizability to community-based samples, across MRI sequences, or with respect to the reliability of longitudinal detection.

Considering the observed association between microbleeds and diseases such as cerebrovascular disease, cerebral amyloid angiopathy, and Alzheimer's disease, as well as the critical role microbleeds may play in treatment trials, it is believed that a standardized way to identify microbleeds, cross-sectionally and longitudinally, that is generalizable across different cohorts will become imperative in assessing microbleed burden. As the elderly population continues to grow, creating consistent, broadly applicable ways of quantifying microhemorrhage location and burden will become increasingly important in both ensuring a high standard of clinical care and providing reliable data to uncover biological causes of microbleeds and how they relate to these diseases.

SUMMARY

Aspects of the present disclosure are directed to a method for cerebral microbleed detection. In some embodiments, the method includes acquiring, by a preprocessor module, magnetic resonance imaging (MRI) image data, the MRI image data including T1-weighted MRI image data and acquired T2*-weighted image data; extracting, by the preprocessor module, extracted T2*-weighted image data from the acquired T2*-weighted image data, the extracted T2*-weighted image data corresponding to gradient echo (GRE) image data or susceptibility-weighted imaging (SWI) image data; resampling, by the preprocessor module, the extracted T2*-weighted image data to a relatively higher resolution to yield resampled image data, the resampled image data including a plurality of slices; identifying, by a detection module, each potential microbleed location in each slice of the resampled image data based, at least in part, on a respective intensity of each of a plurality of resampled image pixels, each potential microbleed location corresponding to a potential region of interest (ROI) and having a circular or ellipsoidal shape to within a shape tolerance; reducing, by the detection module, a number of potential ROIs based, at least in part on at least one reduction criterion to yield a reduced number of potential two-dimensional (2D) ROIs; merging, by the detection module, the reduced number of 2D ROIs into at least one merged potential three dimensional (3D) ROI, the merging performed between a plurality of adjacent slices; defining, by the detection module, a standardized potential 3D ROI for each merged potential 3D ROI, each standardized potential 3D ROI having a respective 3D center and a surrounding neighborhood having a common size; removing, by a 3D geometric filtering module, each potential false positive 3D ROI from the at least one standardized potential 3D ROI based, at least in part, on at least one 3D ROI characteristic of each standardized potential 3D ROI, to yield a number of final potential 3D ROIs; and storing, by a final module, each of the final potential 3D ROIs including a location and a volume, associated with the extracted T2*-weighted image data, for review by a trained rater. In some embodiments, the method includes co-registering, by the preprocessor module, the T1-weighted MRI image data and an atlas-based lobar mask to the resampled image data to generate co-registered image data; and determining, by the preprocessor module, a cerebrospinal fluid (CSF) mask based, at least in part, on a co-registered T1-weighted image data. In some embodiments, the method includes determining, by the final module, a number of identified microbleeds, and generating, by the final module, a distribution of locations using a co-registered lobar mask.

In some embodiments, identifying each potential microbleed location includes determining a 2D image gradient, detecting each edge pixel, applying hysteresis thresholding, and detecting each potential ROI having the circular or ellipsoidal shape. In some embodiments, determining the 2D image gradient is performed using a Sobel filter, each edge pixel is detected using Canny edge detection, and each potential ROI having the circular or ellipsoidal shape is detected using a Hough transform. In some embodiments, removing each potential false positive 3D ROI from the at least one standardized potential 3D ROI includes determining a vesselness of all voxels contained within each standardized potential 3D ROI.

In some embodiments, the at least one reduction criterion includes discarding each potential ROI positioned on an edge of an image, merging a plurality of overlapping ROIs, excluding each ROI having a size greater than a threshold size, excluding each singular ROI, and excluding each ROI that overlaps a cerebrospinal fluid (CSF) mask. In some embodiments, the 3D ROI characteristic includes a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof. In some embodiments, the volume and compactness of the central blob are determined based, at least in part, on Frangi filtering.

Aspects of the present disclosure are directed to a system for cerebral microbleed detection. In some embodiments, the system includes a computing device including a processor, a memory, input/output circuitry, and a data store; a preprocessor module configured to acquire magnetic resonance imaging (MRI) image data, the MRI image data including T1-weighted MRI image data and acquired T2*-weighted image data; a detection module configured to identify each potential microbleed location in each slice of the resampled image data based, at least in part, on a respective intensity of each of a plurality of resampled image pixels, each potential microbleed location corresponding to a potential region of interest (ROI) and having a circular or ellipsoidal shape to within a shape tolerance; a 3D geometric filtering module configured to remove each potential false positive 3D ROI from the at least one standardized potential 3D ROI based, at least in part, on at least one 3D ROI characteristic of each standardized potential 3D ROI, to yield a number of final potential 3D ROIs; and a final module configured to store each of the final potential 3D ROIs including a location and a volume, associated with the extracted T2*-weighted image data, for review by a trained rater.

In some embodiments, the preprocessor module is further configured to extract extracted T2*-weighted image data from the acquired T2*-weighted image data, the extracted T2*-weighted image data corresponding to gradient echo (GRE) image data or susceptibility-weighted imaging (SWI) image data. In some embodiments, the preprocessor module is further configured to resample the extracted T2*-weighted image data to a relatively higher resolution to yield resampled image data, the resampled image data including a plurality of slices. In some embodiments, the detection module is further configured to reduce a number of potential ROIs based, at least in part on at least one reduction criterion to yield a reduced number of potential two-dimensional (2D) ROIs. In some embodiments, the detection module is further configured to merge the reduced number of 2D ROIs into at least one merged potential three dimensional (3D) ROI, the merging performed between a plurality of adjacent slices. In some embodiments, the detection module is further configured to define a standardized potential 3D ROI for each merged potential 3D ROI, each standardized potential 3D ROI having a respective 3D center and a surrounding neighborhood having a common size. In some embodiments, the preprocessor module is configured to co-register the T1-weighted MRI image data and an atlas-based lobar mask to the resampled image data to generate co-registered image data; and to determine a cerebrospinal fluid (CSF) mask based, at least in part, on a co-registered T1-weighted image data. In some embodiments, removing each potential false positive 3D ROI from the at least one standardized potential 3D ROI includes determining a vesselness of all voxels contained within each standardized potential 3D ROI. In some embodiments, the final module is configured to determine a number of identified microbleeds, and to generate a distribution of locations using a co-registered lobar mask.

In some embodiments, the 3D ROI characteristic includes a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof.

Aspects of the present disclosure are directed to a computer readable storage device having stored thereon instructions that when executed by one or more processors result in the following operations including acquiring magnetic resonance imaging (MRI) image data, the MRI image data including T1-weighted MRI image data and acquired T2*-weighted image data; extracting extracted T2*-weighted image data from the acquired T2*-weighted image data, the extracted T2*-weighted image data corresponding to gradient echo (GRE) image data or susceptibility-weighted imaging (SWI) image data; resampling the extracted T2*-weighted image data to a relatively higher resolution to yield resampled image data, the resampled image data including a plurality of slices; identifying each potential microbleed location in each slice of the resampled image data based, at least in part, on a respective intensity of each of a plurality of resampled image pixels, each potential microbleed location corresponding to a potential region of interest (ROI) and having a circular or ellipsoidal shape to within a shape tolerance; reducing a number of potential ROIs based, at least in part on at least one reduction criterion to yield a reduced number of potential two-dimensional (2D) ROIs; merging the reduced number of 2D ROIs into at least one merged potential three dimensional (3D) ROI, the merging performed between a plurality of adjacent slices; defining a standardized potential 3D ROI for each merged potential 3D ROI, each standardized potential 3D ROI having a respective 3D center and a surrounding neighborhood having a common size; removing each potential false positive 3D ROI from the at least one standardized potential 3D ROI based, at least in part, on at least one 3D ROI characteristic of each standardized potential 3D ROI, to yield a number of final potential 3D ROIs; and storing each of the final potential 3D ROIs including a location and a volume, associated with the extracted T2*-weighted image data, for review by a trained rater. In some embodiments, the instructions stored thereon that when executed by one or more processors result in the following operations include co-registering the T1-weighted MRI image data and an atlas-based lobar mask to the resampled image data to generate co-registered image data; and determining a cerebrospinal fluid (CSF) mask based, at least in part, on a co-registered T1-weighted image data. In some embodiments, the instructions stored thereon that when executed by one or more processors result in the following operations including determining a number of identified microbleeds; and generating a distribution of locations using a co-registered lobar mask.

In some embodiments, the at least one reduction criterion includes discarding each potential ROI positioned on an edge of an image, merging a plurality of overlapping ROIs, excluding each ROI having a size greater than a threshold size, excluding each singular ROI, and excluding each ROI that overlaps a cerebrospinal fluid (CSF) mask. In some embodiments, removing each potential false positive 3D ROI from the at least one standardized potential 3D ROI includes determining a vesselness of all voxels contained within each standardized potential 3D ROI. In some embodiments, the 3D ROI characteristic includes a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
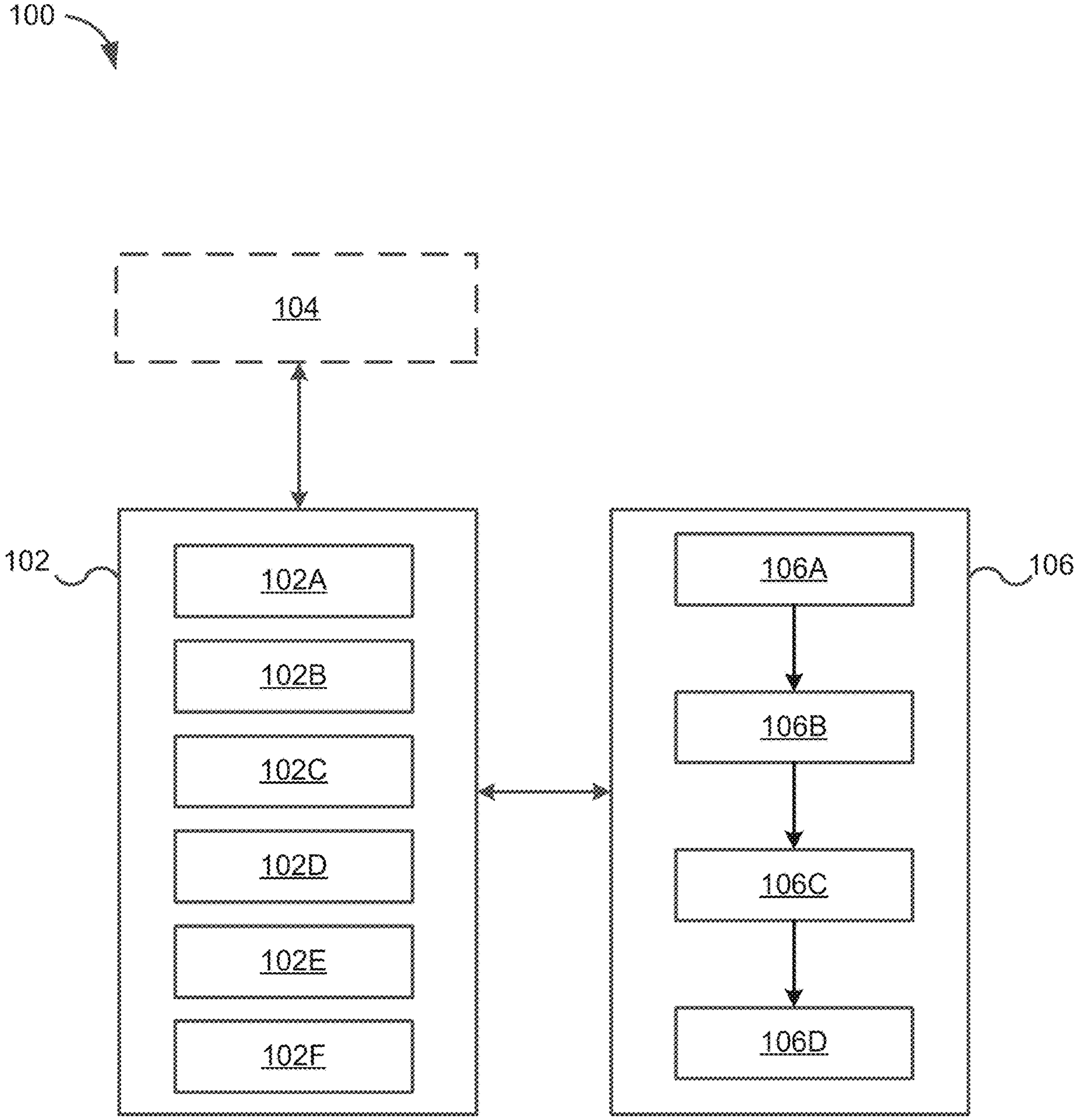
FIG. 1 illustrates a functional block diagram of a system for cerebral microbleed detection according to some embodiments of the present disclosure.

Referring now to FIG. 1, some embodiments of the present disclosure are directed to a cerebral microbleed detection system 100. Cerebral microbleed detection system 100 is configured to receive magnetic resonance imaging (MRI) images and detect cerebral microbleeds present therein. In some embodiments, cerebral microbleed detection system 100 identifies these cerebral microbleeds automatically. In some embodiments, cerebral microbleed detection system 100 detects cerebral microbleeds in predominantly healthy older adults. In some embodiments, cerebral microbleed detection system 100 detects cerebral microbleeds in individuals having and/or developing, or suspected of having and/or developing, a particular neuropathology, e.g., patients with Alzheimer's disease, patients with Down syndrome experiencing an onset of dementia, etc. In some embodiments, cerebral microbleed detection system 100 is used to identify cerebral microbleeds in a single MRI scan event of a patient. In some embodiments, cerebral microbleed detection system 100 is used to longitudinally identify cerebral microbleeds in a patient across a plurality of scans taken at predetermined intervals, e.g., each month, year, etc., in order to track neuropathological development, treatment progress, and the like over a period of time. Cerebral microbleed detection system 100 exhibits higher sensitivity and accuracy in both isolated and longitudinal identification of cerebral microbleeds as compared to the traditional visual rating of these microbleeds via even the most qualified of trained raters.

Referring again to FIG. 1, in some embodiments, system 100 includes a computing device 102. In some embodiments, computing device 102 includes a processor 102A, a memory 102B, input/output (I/O) circuitry 102C, and a data store 102D. In some embodiments, computing device 102 includes a user interface (UI) 102E. In some embodiments, computing device 102 includes a computing system, e.g., a server, a workstation computer, a desktop computer, a laptop computer, a tablet computer, an ultraportable computer, an ultramobile computer, a netbook computer and/or a subnotebook computer, etc., or combinations thereof. In some embodiments, computing device 102 is in communication with a source 104 of MRI images, MRI data, or combinations thereof. In some embodiments, source 104 is an MRI scanner, a computing device configured to receiving and/or process data provided directly from an MRI scanner, a remote server or storage configured to receive and/or store data provided from an MRI scanner, etc., or combinations thereof. In some embodiments, computing device 102 is in communication with source 104 via a wired connection, wireless connection, or combinations thereof, e.g., via input/output (I/O) circuitry 102C.

Still referring to FIG. 1, in some embodiments, system 100 includes a plurality of cerebral microbleed detection modules 106. In some embodiments, processor 102A is configured to perform operations of modules 106. In some embodiments, processor 102A is configured to perform processing operations associated with data acquisition from source 104 for use by modules 106. In some embodiments, computing device 102 includes one or more displays 102F configured to display UI 102E, MRI images, MRI data, etc. from source 104, outputs from modules 106, and the like. In some embodiments, computing device 102 includes one or more graphics processing units (not pictured) to facilitate visualization of information on display 102F. In some embodiments, UI 102E includes a user input device (also not pictured) such as a keyboard, mouse, microphone, touch sensitive display, etc. In some embodiments, memory 102B is configured to store images/data from source 104, modules 106, or combinations thereof. In some embodiments, data store 102D is configured to store MRI images, MRI data, etc. from source 104, outputs from modules 106, or combinations thereof.

In some embodiments, modules 106 include a preprocessor module 106A. In some embodiments, preprocessor module 106A is configured to acquire MRI image data, e.g., from source 104. In some embodiments, the MRI image data includes T1-weighted MRI image data, acquired T2*-weighted image data, or combinations thereof, from a target patient. In some embodiments, preprocessor module 106A is configured to extract T2*-weighted image data from the acquired T2*-weighted image data to yield "extracted" T2*-weighted image data. In some embodiments, the extracted T2*-weighted image data corresponds to gradient echo (GRE) image data and/or susceptibility-weighted imaging (SWI) image data. In some embodiments, the MRI image data is acquired at 3T field strength.

In some embodiments, preprocessor module 106A is configured to resample the extracted T2*-weighted image data to a relatively higher resolution to yield resampled image data. In some embodiments, resampling the extracted T2*-weighted image data increases the resolution by about 5%, 10%, 15%, 20%, 25%, 30%, 35%, 40%, 45%, 50%, 55%, 60%, 65%, 70%, 75%, 80%, 85%, 90%, 95%, 100%, 110%, 120%, 130%, 140%, 150%, 160%, 170%, 180%, 190%, 200%, 225%, 250%, 275%, 300%, 350%, 400%, 450%, 500%, 600%, etc. In some embodiments, the extracted T2*-weighted image data is resampled to ensure microbleeds have a diameter greater than about 5 voxels, greater than about 6 voxels, greater than about 7 voxels, greater than about 8 voxels, greater than about 9 voxels, greater than about 10 voxels, etc. In some embodiments, the voxels are about 1 mm×1 mm. In some embodiments, the extracted T2*-weighted image data includes a plurality of slices. In some embodiments, the resampled image data includes a plurality of slices.

Referring again to FIG. 1, in some embodiments, modules 106 include a detection module 106B. In some embodiments, detection module 106B is configured to identify one or more potential microbleed locations in the slices of the extracted T2*-weighted image data, e.g., the resampled image data. In some embodiments, a microbleed location is identified, at least in part, based on a respective intensity of a plurality of resampled image pixels. The potential microbleed locations correspond to a potential region of interest (ROI). In some embodiments, the ROIs have a circular or ellipsoidal shape to within a shape tolerance. In some embodiments, edges of these a circular or ellipsoidal shaped ROIs are detected, e.g., via Canny edge detection. In some embodiments, the detected edges are then passed through a circular Hough transform set to a moderately stringent threshold, which detects the circular or ellipsoidal regions of interest within each slice with enough sensitivity to detect somewhat irregular edges, as microbleeds are not perfectly circular nor perfectly ellipsoidal. In some embodiments, the valid ROIs are allowed to deviate from a perfectly circular or ellipsoidal shape by ±about 0.01%, 0.015%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, 20%, etc.

In some embodiments, detection module 106B is configured to reduce a number of potential ROIs based, at least in part, on at least one reduction criterion to yield a reduced number of potential two-dimensional (2D) ROIs. In some embodiments, the reduction criterion includes potential ROIs positioned on an edge of an image. ROIs at the edge of the brain may be edge artifacts and not microbleeds. In some embodiments, the reduction criterion includes merging a plurality of overlapping ROIs and excluding each ROI having a size greater than a threshold size. In some embodiments, the threshold size is greater than about 1.1 mm, 1.15 mm, 1.2 mm, etc. In some embodiments, the reduction criterion includes merging a plurality of overlapping ROIs and excluding singular ROIs. In some embodiments, the reduction criterion includes merging a plurality of overlapping ROIs and excluding ROIs that overlap a cerebrospinal fluid (CSF) mask. ROIs appearing within the CSF are likely vessels, not microbleeds. In some embodiments, to obtain the CSF exclusion mask, a corresponding structural T1 MRI is coregistered to the image of interest and is segmented to provide an estimate of the CSF locations within the brain. In some embodiments, preprocessor module 106A is configured to co-register the T1-weighted MRI image data and an atlas-based lobar mask to the resampled image data to generate co-registered image data; and to determine the CSF mask based, at least in part, on a co-registered T1-weighted image data. In some embodiments, detection module 106B is configured to define one or more standardized potential 3D ROI for merged potential 3D ROIs. In some embodiments, the standardized potential 3D ROIs have a respective 3D center and a surrounding neighborhood having a common size. In some embodiments, potential microbleeds have an area of about 51×51×25 voxels centered at the 3D center of the standardized potential ROIs.

In some embodiments, detection module 106B is configured to merge the reduced number of 2D ROIs into at least one merged potential three dimensional (3D) ROI, the merging performed between a plurality of adjacent slices.

Still referring to FIG. 1, in some embodiments, system 100 includes a 3D geometric filtering module 106C. Due to the high specificity of the systems and methods of the present disclosure, in some embodiments, false positive locations from the identified mask are removed. In some embodiments, filtering module 106C is configured to remove potential false positive 3D ROIs from the standardized potential 3D ROIs.

To remove false positive locations from an MRI image, the noisy nature of the false positive locations can be used to assist in separating them from the true microbleeds. In some embodiments, filtering module 106C removes potential false positive 3D ROIs based, at least in part, on at least one 3D ROI characteristic of each standardized potential 3D ROI. As a result of this removal, filtering module 106C yields a number of final potential 3D ROIs. In some embodiments, the 3D ROI characteristics include a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof. In some embodiments, filtering module 106C removes potential false positive 3D ROIs by, at least in part, determining a vesselness of all voxels contained within each standardized potential 3D ROI.

Image entropy is a measure of voxel intensity homogeneity within a given image. If all voxels are the same intensity, then the image entropy is zero. If voxels include white noise, i.e., random distribution across the entire intensity spectrum, intensity is maximized. Without wishing to be bound by theory, for a given potential microbleed location, a very high entropy (indicating noise) or a very low entropy (indicating the absence of variation consistent with a location overlapping with the edge of the brain) are expected to be false positives, while locations with a modest degree of entropy could be true positives. In some embodiments, true positive locations have an entropy in the range of about 5-7. In some embodiments, entropy is measured as mutual information entropy, i.e., weighting local clusters of voxels by how similar their entropy is, rather than computing entropy solely on an entire image, as a way to further tune the sensitivity of this measure to the presence of true positives.

Blob analysis, or the identification of irregular ROIs within an image, gives two useful measures in detecting true microbleed locations. In some embodiments, first, a Frangi filter is applied to the location and the surrounding neighborhood, e.g., 51×51×25 box centered at the location identified by the system described above, to extract any spherical or tubular structures. Without wishing to be bound by theory, in some embodiments, a true microbleed location has one ellipsoid structure near the center of the ROI, with noise around the perimeter. In some embodiments, a false location will have noise throughout the structure (or in the case of a vessel, a tube running continuously through the box). The one location will take up a modest amount of space in the box and will be relatively compact, i.e., the ratio of the squared number of perimeter voxels to the volume of the blob will be relatively small. In the current implementation, true locations tend to have a compactness of 400-1000 and a volume of about 400-1100. After this thinning step is complete, these locations are output as a volume.

Referring again to FIG. 1, in some embodiments, system 100 includes a final module 106D. In some embodiments, final module 106D is configured to store the final potential 3D ROIs. In some embodiments, the final potential 3D ROIs include a location and a volume, associated with the extracted T2*-weighted image data. In some embodiments, the final potential 3D ROIs are then provided for review by a trained rater, e.g., nurse, physician, etc. In some embodiments, final module 106D is configured to determine a number of identified microbleeds. In some embodiments, final module 106D is configured to generate a distribution of locations using a co-registered lobar mask.

Figure 2:
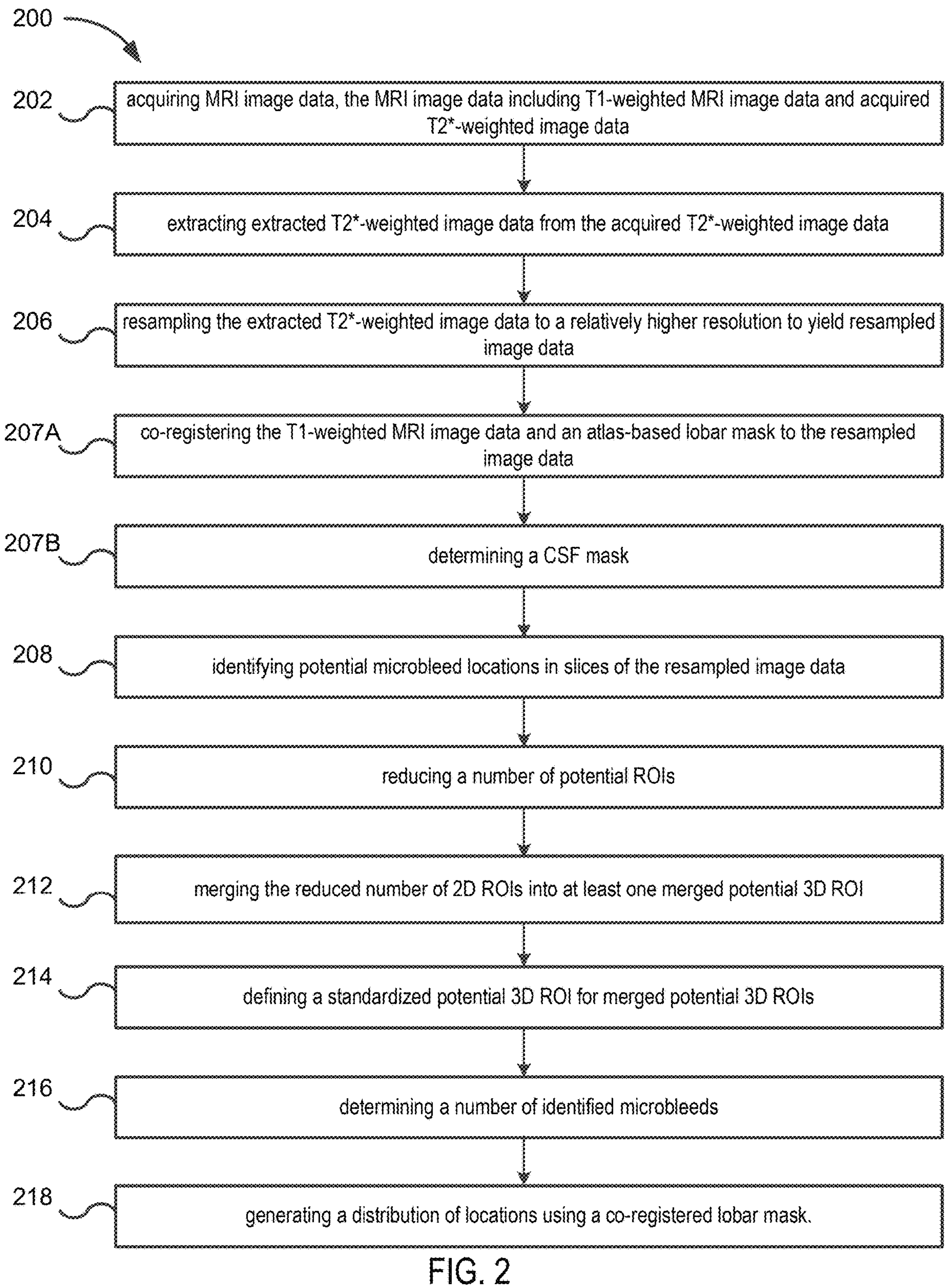
FIG. 2 is a chart of operations for cerebral microbleed detection resulting from instructions executed by one or more processors of a computer readable storage device according to some embodiments of the present disclosure.

Referring now to FIG. 2, some embodiments of the present disclosure are directed to a computer readable storage device, e.g., computing device 102 shown above, having stored thereon instructions that when executed by one or more processors, e.g., 102A shown above, result in a plurality of operations 200. In some embodiments, operations 200 include acquiring 202 MRI image data, the MRI image data including T1-weighted MRI image data and acquired T2*-weighted image data.

In some embodiments, operations 200 include extracting 204 extracted T2*-weighted image data from the acquired T2*-weighted image data. As discussed above, in some embodiments, the extracted T2*-weighted image data corresponds to GRE image data or SWI image data. In some embodiments, the systems and methods of the present disclosure are combined with one or more other modalities, extract information from the area surrounding an ROI as well as the ROI itself, or combinations thereof. In some embodiments, the systems and method of the present disclosure explicitly include phase information from the SWI images, as SWI is more sensitive to paramagnetic deposits because it incorporates the distortions within the phase image into the scan. In these embodiments, the phase image as well as the final SWI image are explicitly processed to look for these specific local distortions as a way of reducing the number of false positives due to gradient changes unrelated to susceptibility effects, e.g., cerebellar folds. The inclusion of phase image information would allow for a more specific determination of iron deposition, especially when compared to calcium deposits, as they shift the phase in opposite directions.

In some embodiments, operations 200 include resampling 206 the extracted T2*-weighted image data to a relatively higher resolution to yield resampled image data. In some embodiments, these small hemorrhages are visualized as circular or ellipsoidal hypointensities on T2*MRI sequences. In some embodiments, the sequence of interest is resampled to a resolution at which microbleeds appear at a minimum of 5 voxels in diameter. In some embodiments, the image space is about 1536×1536×450. In some embodiments, the resampled image is then processed slice-wise, e.g., with each slice undergoing Canny edge detection to locate, e.g., the most prominent edges within the slice.

As discussed above, in some embodiments, operations 200 include co-registering 207A the T1-weighted MRI image data and an atlas-based lobar mask to the resampled image data to generate co-registered image data. In some embodiments, operations 200 include determining 207B a CSF mask based, at least in part, on a co-registered T1-weighted image data.

In some embodiments, operations 200 include identifying 208 potential microbleed locations in slices of the resampled image data. In some embodiments, identifying 208 is based, at least in part, on a respective intensity of each of a plurality of resampled image pixels. As discussed above, in some embodiments, the potential microbleed locations corresponds to a potential ROI and having a circular or ellipsoidal shape to within a shape tolerance.

In some embodiments, operations 200 include reducing 210 a number of potential ROIs. In some embodiments, reducing 210 is based, at least in part on at least one reduction criterion to yield a reduced number of potential 2D ROIs. As discussed above, in some embodiments, the at least one reduction criterion includes discarding each potential ROI positioned on an edge of an image, merging a plurality of overlapping ROIs, excluding each ROI having a size greater than a threshold size, excluding each singular ROI, and excluding each ROI that overlaps the CSF mask. In some embodiments, operations 200 include merging 212 the reduced number of 2D ROIs into at least one merged potential 3D ROI. As discussed above, in some embodiments, merging 212 is performed between a plurality of adjacent slices. In some embodiments, operations 200 include defining 214 a standardized potential 3D ROI for merged potential 3D ROIs. As discussed above, the standardized potential 3D ROIs have at least a respective 3D center and a surrounding neighborhood having a common size.

In some embodiments, operations 200 include removing 212 potential false positive 3D ROIs from the at least one standardized potential 3D ROI to yield a number of final potential 3D ROIs. As discussed above, in some embodiments, removing 212 is based, at least in part, on at least one 3D ROI characteristic of standardized potential 3D ROIs, e.g., a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof. In some embodiments, removing 212 potential false positive 3D ROIs includes determining a vesselness of all voxels contained within each standardized potential 3D ROI.

In some embodiments, operations 200 include storing 214 the final potential 3D ROIs for review by a trained rater. In some embodiments, the stored final potential 3D ROIs include a location and a volume, associated with the extracted T2*-weighted image data. In some embodiments, operations 200 include determining 216 a number of identified microbleeds. In some embodiments, operations 200 include generating 218 a distribution of locations using a co-registered lobar mask.

Figure 3:
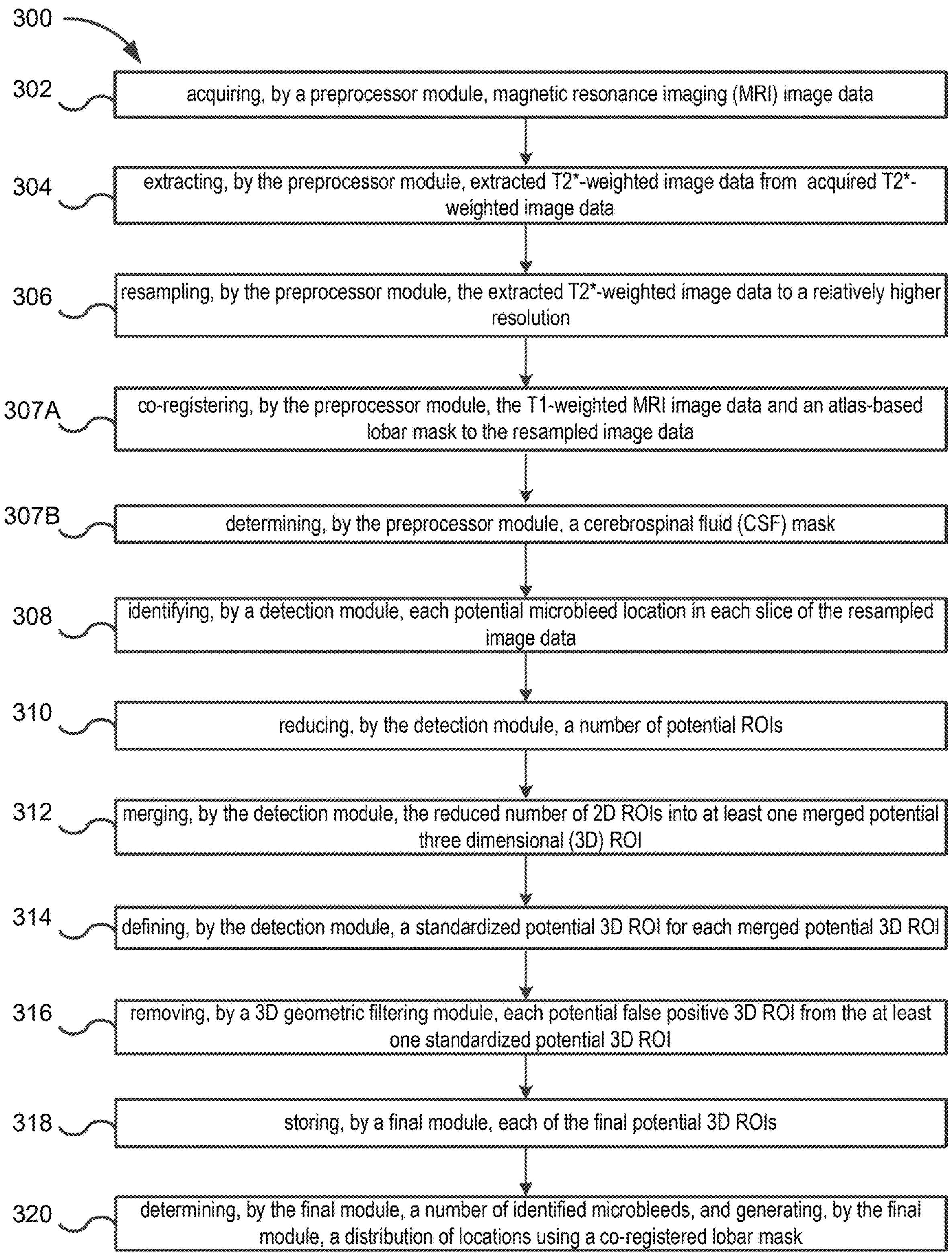
FIG. 3 is a chart of a method for cerebral microbleed detection according to some embodiments of the present disclosure.

Referring now to FIG. 3, some embodiments of the present disclosure are directed to a method 300 for cerebral microbleed detection. At 302, MRI image data is acquired. As discussed above, in some embodiments, MRI image data is acquired 302 by a preprocessor module. In some embodiments, the MRI image data includes T1-weighted MRI image data and acquired T2*-weighted image data.

At 304, extracted T2*-weighted image data from the acquired T2*-weighted image data is extracted. As discussed above, in some embodiments, the extracted T2*-weighted image data is extracted 304 by the preprocessor module. In some embodiments, the extracted T2*-weighted image data includes GRE image data or SWI image data.

At 306, the extracted T2*-weighted image data is resampled to a relatively higher resolution to yield resampled image data. As discussed above, in some embodiments, the extracted T2*-weighted image data is resampled 306 by the preprocessor module. In some embodiments, the resampled image data includes a plurality of slices.

In some embodiments, at 307A, the T1-weighted MRI image data and an atlas-based lobar mask are co-registered to the resampled image data to generate co-registered image data. In some embodiments, at 307B, a CSF mask based, at least in part, on a co-registered T1-weighted image data is also determined. As discussed above, in some embodiments, co-registering 307A and determining step 307B are performed by the preprocessor module.

At 308, potential microbleed locations in the resampled image data, which correspond to a potential ROIs, are identified. As discussed above, in some embodiments, potential microbleed locations are identified 308 by a detection module. In some embodiments, identification of potential microbleed locations is based, at least in part, on a respective intensity of a plurality of resampled image pixels. In some embodiments, potential microbleed locations also have a circular or ellipsoidal shape to within a shape tolerance. In some embodiments, identifying 308 potential microbleed locations includes determining a 2D image gradient, detecting each edge pixel, applying hysteresis thresholding, and detecting each potential ROI having the circular or ellipsoidal shape. In some embodiments, determining the 2D image gradient is performed, e.g., using a Sobel filter, edge pixels are detected, e.g., using Canny edge detection, and potential ROIs having the circular or ellipsoidal shape are detected, e.g., using a Hough transform.

At 310, the number of potential ROIs is reduced. As discussed above, in some embodiments, reducing 310 the number of potential ROIs is performed by the detection module. In some embodiments, reducing 310 the number of potential ROIs is based, at least in part, on at least one reduction criterion to yield a reduced number of potential 2D ROIs. As discussed above, in some embodiments, the reduction criterion include discarding each potential ROI positioned on an edge of an image, merging a plurality of overlapping ROIs, excluding each ROI having a size greater than a threshold size, excluding each singular ROI, and excluding each ROI that overlaps the CSF mask.

At 312, the reduced number of 2D ROIs are merged into at least one merged potential 3D ROI. As discussed above, in some embodiments, merging 312 the 2D ROIs is performed by the detection module. In some embodiments, a plurality of adjacent slices are merged 312.

At 314, a standardized potential 3D ROIs for the merged potential 3D ROIs is defined. As discussed above, in some embodiments, defining 314 standardized potential 3D ROIs is performed by the detection module. Further, as discussed above, the standardized potential 3D ROIs have a respective 3D center and a surrounding neighborhood having a common size.

At 316, potential false positive 3D ROIs are removed from the at least one standardized potential 3D ROI to yield a number of final potential 3D ROIs. As discussed above, in some embodiments, potential false positive 3D ROIs are removed 316 by a 3D geometric filtering module. In some embodiments, potential false positive 3D ROIs are removed 316 based, at least in part, on at least one 3D ROI characteristic of the standardized potential 3D ROI. In some embodiments, the 3D ROI characteristic includes a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof. In some embodiments, the volume and compactness of the central blob are determined based, at least in part, on Frangi filtering. In some embodiments, removing 316 potential false positive 3D ROIs includes determining a vesselness of all voxels contained within each standardized potential 3D ROI.

At 318, final potential 3D ROIs including a location and a volume are stored for review by a trained rater. As discussed above, in some embodiments, storing 318 is performed by a final module. At 320, a number of identified microbleeds is determined and, in at least some embodiments, a distribution of locations using a co-registered lobar mask is generated. As discussed above, in some embodiments, step 320 is also performed by the final module.

EXAMPLE 1

Participants. Participants were selected from the Washington Heights-Inwood Columbia Aging Project (WHICAP), a community-based study of cognitive aging and dementia among Medicare-eligible residents of northern Manhattan New York. WHICAP participants were recruited in 3 waves, beginning in 1992, 1999, and 2009. MRI was first introduced into WHICAP in 2004 using a 1.5 T MRI system and repeated on a subset of participants. Beginning in 2011, participants from the cohort recruited in 2009 received high-resolution MRI scanning using a 3 T MRI system, and scans were once again repeated after 4.9±1.3 (mean±standard deviation) years on a subset of these participants. Randomly selected subsets of participants with available 3T MRI scans, including both SWI and GRE sequences, were included in this study (n=78): one group (n=44) was randomly selected from individuals rated visually as having at least one microbleed; the other group (n=34) was randomly selected from individuals rated visually as not having any microbleeds. Fourteen of the microbleed positive participants had a follow-up MRI scan including SWI available at the time this study was performed, so these participants formed the longitudinal sample. GRE images were not collected at follow-up. In accordance with the University guidelines and regulations, the WHICAP study and use of the data was approved by the Institutional Review Board of Columbia University, and all participants signed an informed consent form.

MRI Acquisition. Magnetic resonance images were obtained using a 3 T Philips Intera scanner at Columbia University between 2011 and 2018. T1-weighted (repetition time=6.6 ms, echo time=3.0 ms, field of view=256×200 $mm^2$, 1-mm slice thickness), T2*-weighted SWI (repetition time=17 ms, echo time=24 ms, field of view=244×197 $mm^2$, 2 mm slice thickness, in plane resolution 0.43×0.43 mm), and T2*-weighted GRE (repetition time=15 ms, echo time=22 ms, field of view=220×181 $mm^2$, 1 mm slice thickness, in plane resolution 0.43×0.43 mm) MRI images were acquired for each participant at baseline, and T1-weighted and T2*-weighted SWI images using the same parameters were acquired for the subset of participants who completed follow-up scans.

Visual microbleed ratings. Consistent with previous studies done in the WHICAP cohort, microbleeds were rated by visual inspection using criteria suggested by Greenberg and colleagues. These criteria include the following guidelines: a dark (black) lesion on T2*-weighted MRI, accompanied by a “blooming” effect, which is round or ovoid and at least half-way surrounded by parenchyma (to distinguish microbleeds from vessels). The microbleed is devoid of signal hyperintensity on accompanying T1-weighted sequences and is distinguishable from other mimics (e.g., calcium deposits, bone, or vessel flow). Microbleeds were visually classified by location, including lobar (frontal, temporal, parietal, and occipital lobes) and deep (basal ganglia, thalamus, and infratentorial regions) locations. The number of microbleeds and location were noted for each participant. Three raters, each trained in visually identifying microbleeds, rated the entirety of the SWI and GRE scans, and microbleed locations, which were identified as true locations by either two or three raters, were used as the ground truth locations for testing the sensitivity of the algorithm, with unanimously identified locations representing definite microbleeds and locations identified by only two raters representing potential microbleeds. For longitudinal validation, two of the three raters rated the repeat SWI scans for microbleeds, and their agreement/disagreement is noted in the results. In this study, participants were designated as microbleed positive if two or three raters agreed there was at least one microbleed in the brain, and microbleed negative if all raters agreed that no microbleeds were present. (Participants who had a microbleed identified by only one rater were excluded from this analysis. They would be considered microbleed negative by visual rating standards, but to maximize the difference between true and false positives, these were excluded as too ambiguous). Both percentage agreement (defined as the number of locations labeled by both raters divided by the total number of locations labeled) and Fleiss' kappa were used to assess interrater and intra-rater reliability across modalities. These assessments were performed to ensure the visual ratings provided a reliable ground truth to judge the algorithm-segmented microbleeds against. While the kappa score is frequently used to assess interrater agreement, it applies a very conservative estimate of rater agreement by correcting for probability of agreement in pure guessing. The true agreement level typically lies somewhere between the uncorrected agreement and the kappa score, so both methods were used to assess agreement between visual ratings.

Figure 4:
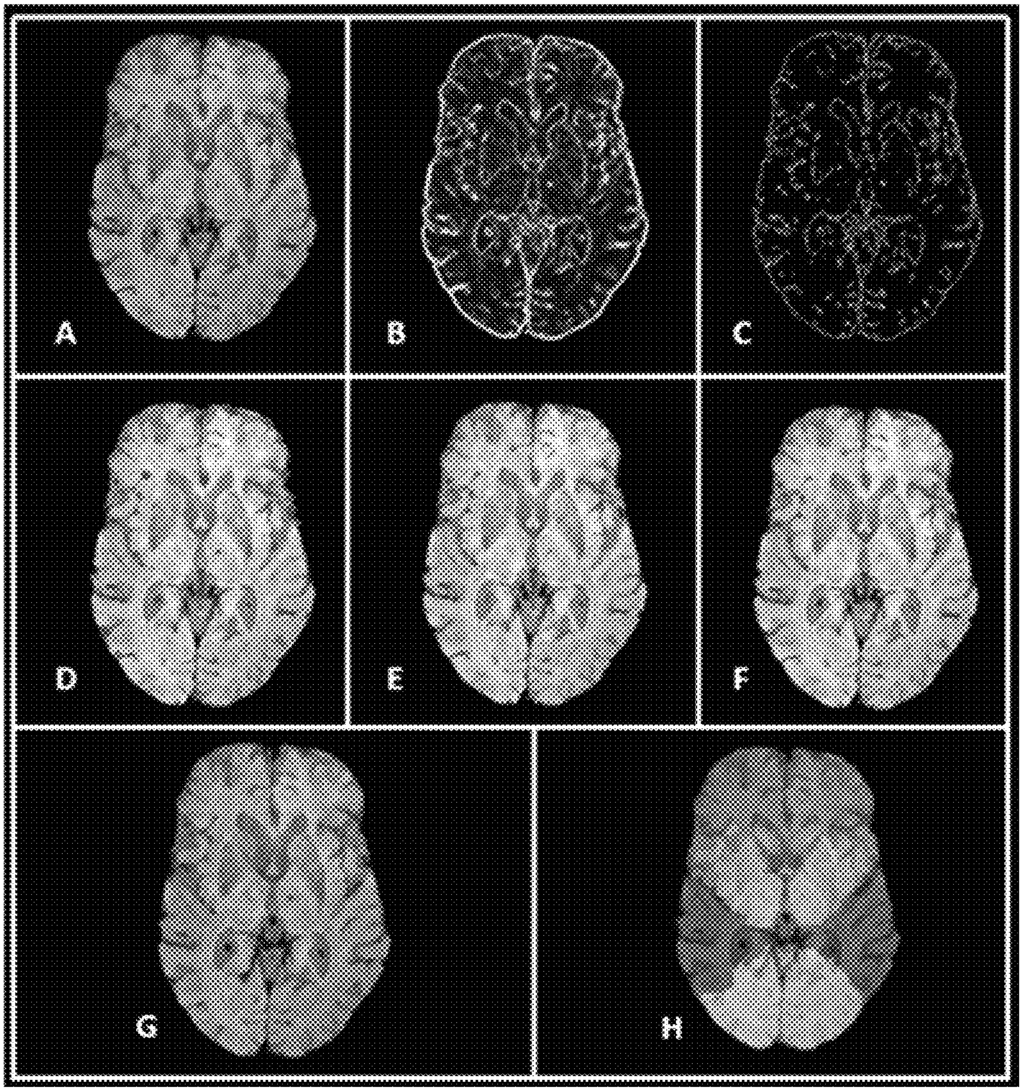
FIG. 4 is an image portraying the use of systems and methods according to some embodiments of the present disclosure for cerebral microbleed detection.
Figures 5A, 5B:
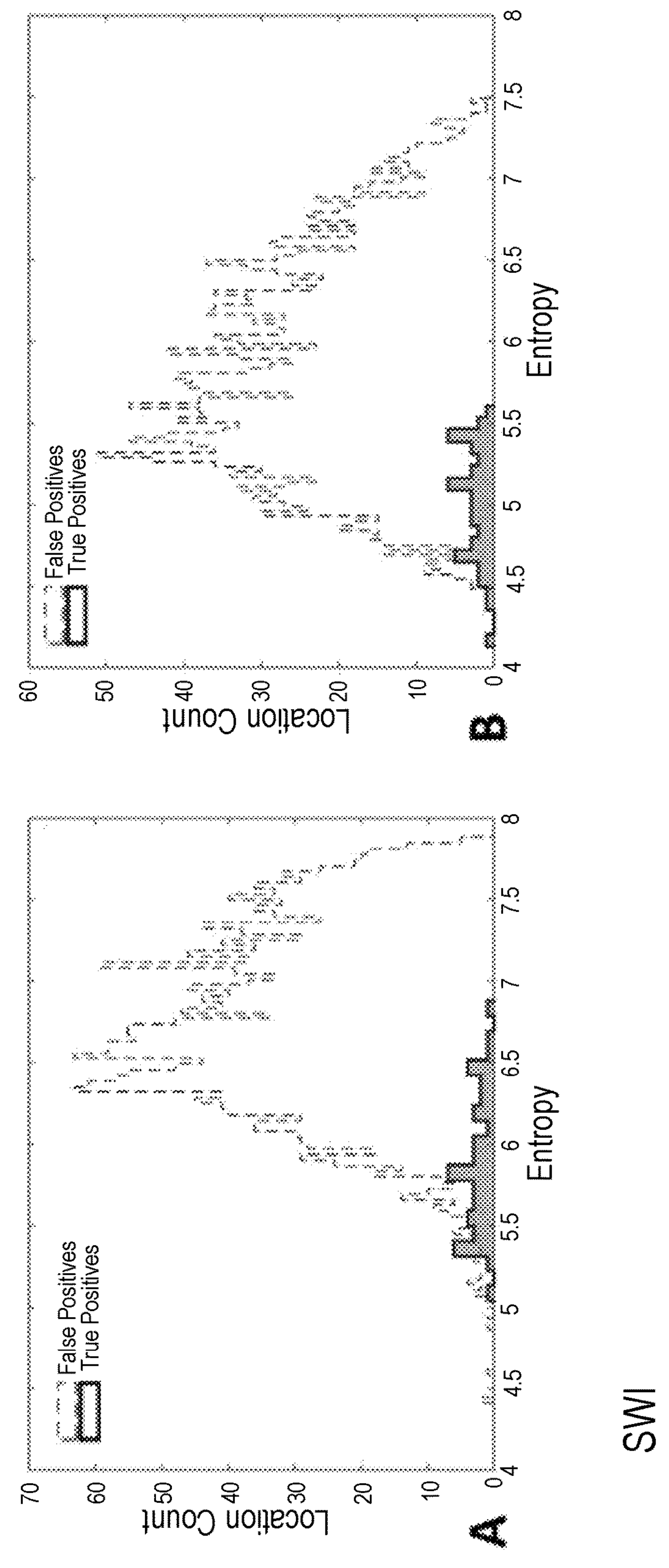
FIGS. 5A-5H are graphs portraying geometric measure cutoff justifications related to cerebral microbleed detection according to some embodiments of the present disclosure.
Figures 5C, 5D:
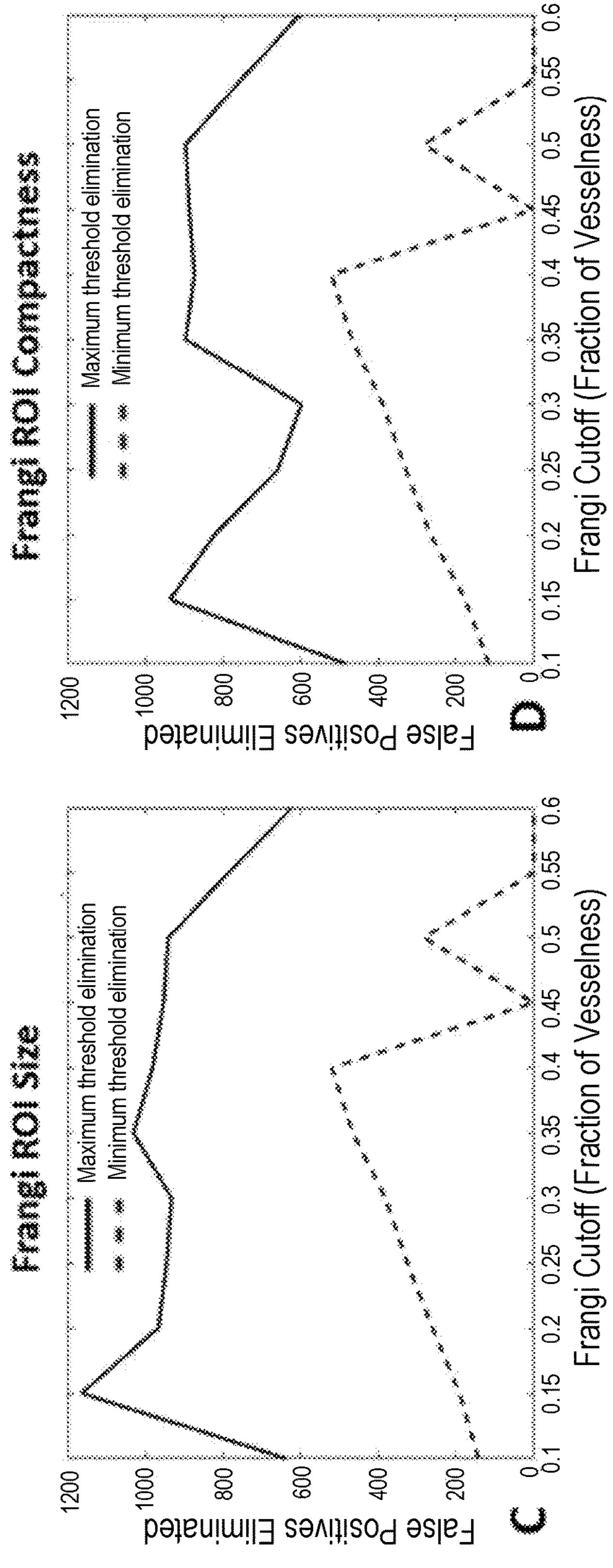
Figures 5E, 5F:
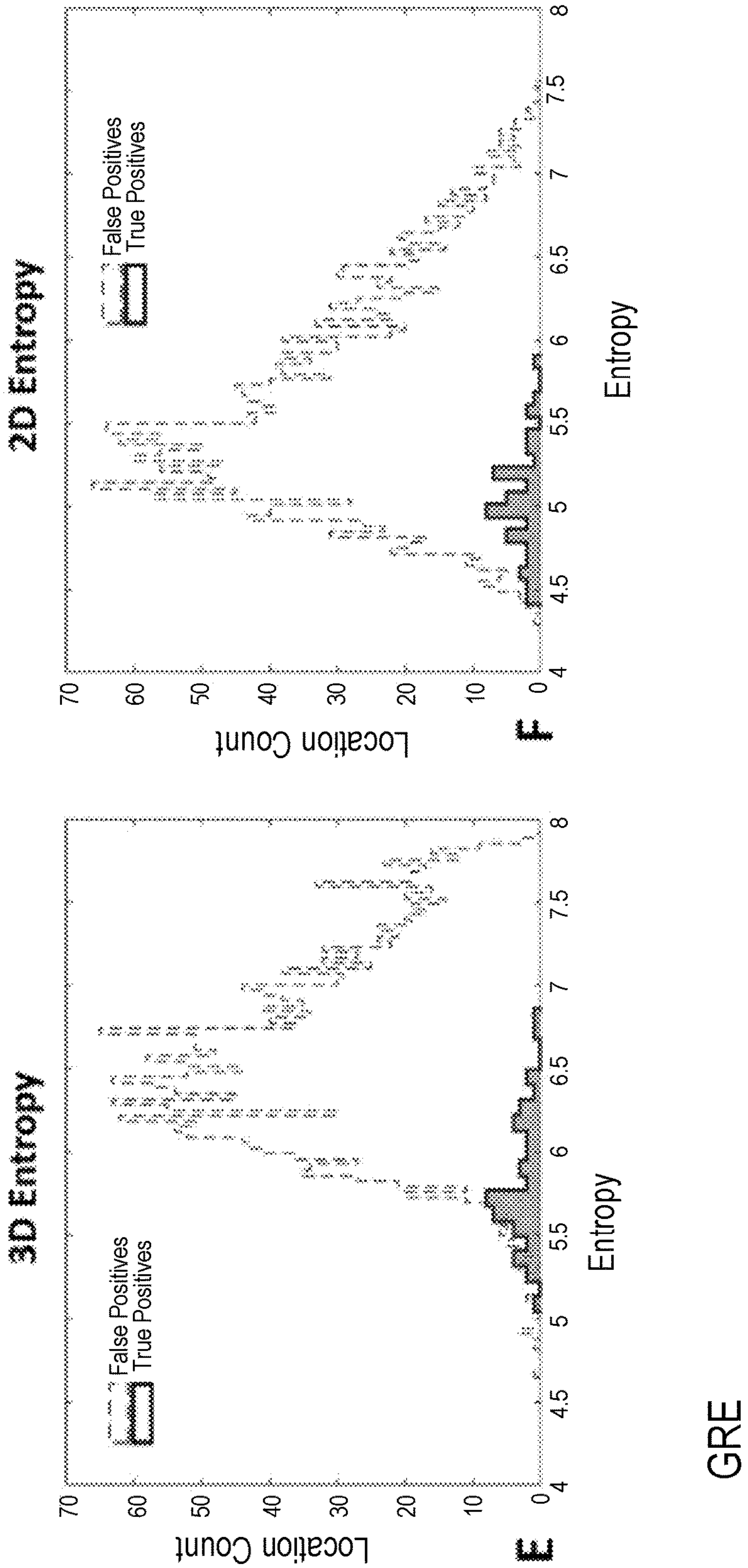
Figures 5G, 5H:
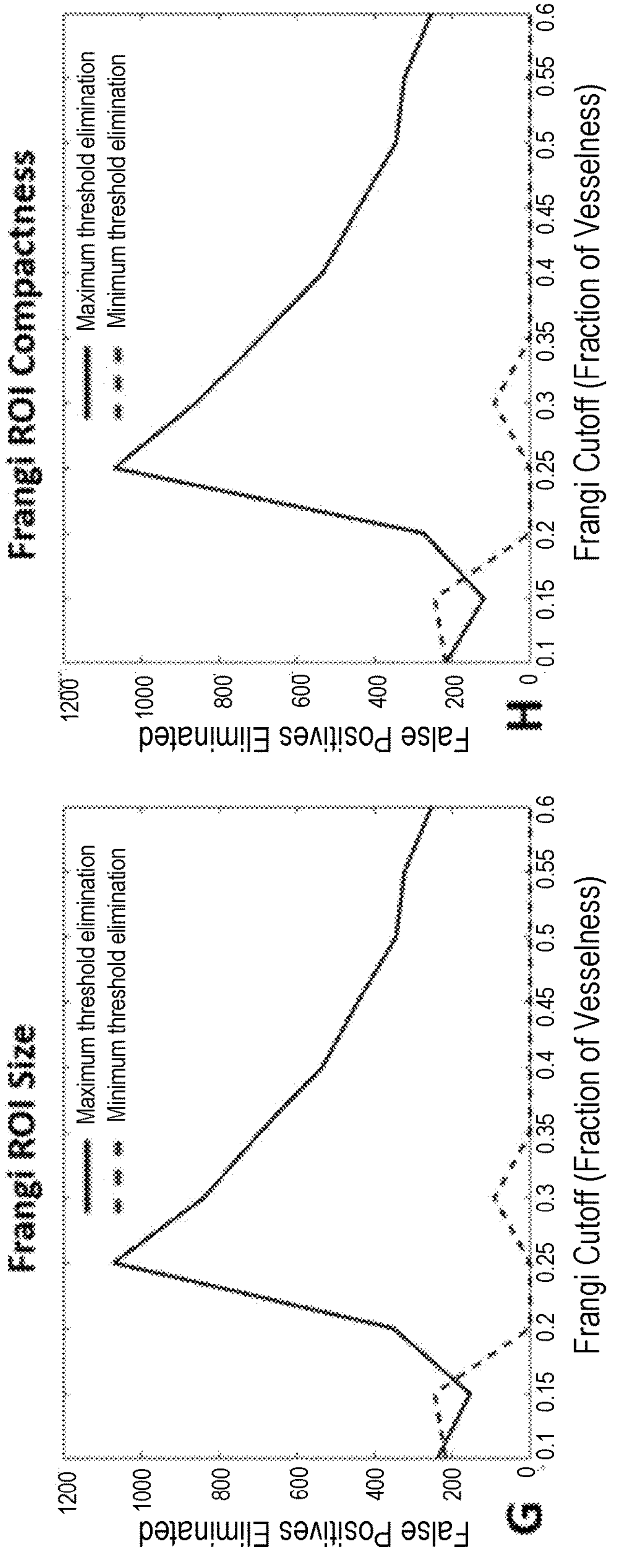

MRI preprocessing. Images corresponding to steps of an exemplary embodiment of the present disclosure are illustrated by FIG. 4. Before the microbleed detection began, a few preprocessing steps were performed. The SWI and GRE scans for each participant were brain extracted using FSL Brain Extraction Toolbox. The T1-weighted image and a lobar mask from FSL's MNI atlas were co-registered to the SWI and GRE images separately; identification of microbleeds was done in the native space of each SWI and GRE scan. The co-registered T1-weighted volume was used to compute the CSF mask using the Statistical Parametric Mapping toolbox (SPM 12). Finally, the SWI and GRE scans were resampled to a higher resolution (see panel A) so that all artifacts that were potentially microbleeds had a diameter of at least six voxels to ensure an accurate identification when using a circular Hough transform (see below). Resampling helps ensure that the artifacts of interest are of sufficient size and circularity to be detected by the circular Hough transform. As discussed above, in some embodiments, this step was accomplished by scaling the images by a factor of three.

Detection of potential microbleed regions of interest. Initially, potential microbleed locations were identified as circular regions of interest (ROIs) on each slice. For each slice of the GRE or SWI image, the 2D image gradient was computed with a 3×3 Sobel filter (see panel B). Then, edge pixels were detected using and edge detection algorithm, e.g., the Canny edge detection algorithm, to remove all neighboring voxels that are not local maxima. Hysteresis thresholding (lower bound=0.1, upper bound=0.15) was used to remove spurious edges as a result of noise. The final edges left after this method are illustrated in panel C of FIG. 4.

Once the edge pixels were identified, a circular Hough transform was used to detect circular ROIs on each slice. In this exemplary embodiment, the circular Hough transform was used to identify these ROIs over other methods (notably over the radial symmetry transform, which has been suggested as a method of detecting microbleeds previously) because it allows for a more lenient definition of circularity, and it is therefore more sensitive to ovoid shapes. Potential circular ROIs on each slice were identified after restricting the radius to vary within a physiologically useful range ($r \in [5,12]$, 0.72-1.72 mm) and thresholding at a lenient threshold of 80% of the maximum overlap in the Hough transform (see panel D).

The large number of potential locations was then thinned using physiologically relevant criteria, analogous to the criteria used in visual inspection. First, all ROIs lying on the edges of the image were discarded. Overlapping ROIs that remain were merged together, and any that were too large to be true microbleeds, using a lenient cutoff of distance between centers greater than eight pixels (1.15 mm), or singular ROIs, i.e., circles unmerged with others, indicating an edge arising from noise, were excluded (see panel F). Finally, all ROIs that overlapped with the CSF mask (segmented from co-registered T1) were excluded as vessels, similar to the visual rating criteria. The remaining locations marked on each slice were then merged across slices. The final ROI representing a potential microbleed was defined as the 3D center of the potential microbleed and a surrounding neighborhood of a standardized size (51×51×25 voxels, or two times the maximum expected size of a microbleed). This definition was used because a neighborhood of this size both ensures the entire microbleed artifact will be captured for analysis in the next stage and also standardizes the selected ROIs, making geometric features more comparable. At this stage of the algorithm, the sensitivity of detection of microbleeds compared with ground truth visual ratings was tested to ensure that the automatic labeling was accurately capturing the visually labeled microbleeds.

3D geometric filtering. To assist in the removal of false positive locations, the geometric information included in each ROI identified in the previous step was used. a priori, four characteristics of the ROI were selected as having the potential to differentiate between true and false positive locations: the 3D image entropy of the ROI, the 2D image entropy of the maximum intensity projection of the ROI, and the volume and compactness of the central blob in each ROI as identified via Frangi filtering.

In an image, each pixel i has a probability pi of being a given intensity, measured as the fraction of all pixels in the image at that intensity. Image entropy E is defined based on this intensity probability distribution such that $$E = -\sum_i p_i \log_2 p_i$$

In a typical 8-bit greyscale image, entropy will lie in the range from zero (all pixels are the same intensity) to eight (all $2^8$ shades of grey have an equal chance of occurring). In a 3D image with a large signal void in the center surrounded by parenchyma, characteristic of a true microbleed, a moderate amount of entropy was expected, while in an area characterized by many sharp gradient changes, characteristic of a false positive, a higher amount of entropy indicating a noisy, false positive region was expected. In a 2D maximum intensity projection of a true microbleed, a lower entropy than in the case of a false positive was expected, as the sharp gradient change around a microbleed tends to leave a small hyperintense ring around the location. However, as this feature is much smaller than the signal void, the 2D entropy was now expected to be as sharply distinctive as the 3D entropy. True and false positive ROI entropies are illustrated in FIGS. 5A-5H. These figures illustrate the geometric properties used to remove false positives from the identified locations in SWI and GRE images. Modalities are separated into panels.

The Frangi filter utilizes the second order derivatives of an image to extract spatial information about the geometry of an ROI. In a 3D image I, the Hessian matrix H at each location is defined as the matrix $$H = \begin{bmatrix} I_{xx} & I_{xy} & I_{xz} \\ I_{yz} & I_{yy} & I_{yz} \\ I_{zx} & I_{zy} & I_{zz} \end{bmatrix}$$

The eigenvalues of the Hessian $\lambda_1$, $\lambda_2$, $\lambda_3$ are defined to be ordered such that $|\lambda_1| \leq |\lambda_2| \leq |\lambda_3|$. When the structure of interest is hypointense compared with the surroundings, which is true for both microbleeds and vessels on T2*-weighted images, $\lambda_1, \lambda_2, \lambda_3 \geq 0$. The vesselness of each voxel i can therefore be described as $$V(i) = \begin{cases} 0 & \text{if } \lambda_2 < 0 \text{ or } \lambda_3 < 0 \\ \left(1 - \exp\left(-\frac{R_A^2}{2a^2}\right)\right)\exp\left(-\frac{R_B^2}{2\beta^2}\right)\left(1 - \exp\left(-\frac{S^2}{2c^2}\right)\right) & \text{in all other cases} \end{cases}$$

where $R_A$, $R_B$, and S are ratios including structural information from the eigenvalues, defined as $$R_A = \frac{|\lambda_2|}{|\lambda_3|}$$

$$R_B = \frac{|\lambda_1|}{\sqrt{|\lambda_2 \lambda_3|}}$$

$$S = \sqrt{\lambda_1^2 + \lambda_2^2 + \lambda_3^2}$$

and α, β, c are constants used to tune the sensitivity of the filter to the structural ratios. In this implementation, values of α=0.5, 8=0.5 and c as half of the Hessian norm were used. The vesselness of an ROI can assist in separating true positive from false positive locations, since a tubular artifact, such as a vessel, will have a high vesselness within the region ($R_A$~1 and $R_B$~0), an ovoid artifact will have a lower degree of vesselness ($R_A$ ~1 and $R_B$~1), and an ROI including high-gradient noise will have a vesselness approaching zero ($|\lambda_1| \sim |\mu_2| \sim \mu_3| \sim 0$).

In a standard Frangi filter, when filtering for large tubular structures such as vessels, vesselness is computed across a range of scales determined by different Gaussian filters. Since the artifacts measured are relatively small and did not vary greatly in size, the benefits of maximizing over a range of scales was not worth the computational cost, so only the vesselness as measured in the resampled space without any Gaussian blur was used.

Once the vesselness of all the voxels within each ROI was computed, blob analysis was used to extract the central blob of each ROI defined as all non-zero voxels grouped via 26-connected neighborhood to the non-zero voxel closest to the center of the ROI. First, the vesselness within an ROI was used to create a binary mask, by thresholding as a fraction of the maximum vesselness within the ROI. Testing was performed in a range of 0.1 (not zero to exclude noise) to 0.6 (higher levels are useful to distinguish vessels, not ovoid locations such as microbleeds). The volume, defined as the number of voxels with the blob, and compactness, defined as square of the number of perimeter voxels of the blob divided by the volume of the blob, were noted for this central blob. The number of false positives eliminated at this step using the volume and compactness (minimum and maximum cutoffs) are illustrated in FIGS. 5A-5H. After this step, the precision of the algorithm (percentage of true positives to total number of labeled locations) was also computed.

Final counting and location step. After the vast majority of false positives were removed by the previous step, the remaining ROIs were saved in the native space of the modality of interest (SWI or GRE) in an easily viewable and editable format for correction by a trained rater. The difference in rating times between visual ratings and rating the automatically segmented images was evaluated in a separate group of 20 SWI scans. The co-registered lobar mask was used to count automatically the number of microbleeds identified and output the distribution of locations throughout the brain for further analysis. For the longitudinal scans, an additional visual rating was done using the algorithm's output locations to confirm that the locations being detected at multiple timepoints were indeed microbleeds, i.e., visual ratings were done blinded to the algorithm, and then redone using the algorithm's output across both timepoints.

Demographic information. The demographic characteristics of the study cohort are presented in Table 1. Participants were designated as either microbleed positive (one or more microbleeds identified by two or more raters) or microbleed negative (no microbleeds identified by any rater). Microbleed positive participants were slightly older than microbleed negative participants (t(76)=2.21, p=0.03), but did not differ in terms of sex/gender (ι2 (1, N=78)=1.37, p=0.24) and race/ethnicity (ι2(3, N=78)=7.29, p=0.06). The microbleed positive participants who had a follow-up MRI scan about five years later had similar distribution of sex/gender (ι2(1, N=58)=0.58, p=0.45) and race/ethnicity (ι2(3, N=58) =2.09, p=0.55) to the baseline sample of microbleed positive participants.

TABLE 1

Demographic characteristics of individuals with and without microbleeds. As noted in the methods, microbleed positive participants are those who have at least one microbleed present (identified by two or more raters), and microbleed negative participants are those who have no microbleeds present (agreed by all three raters).

| Microbleed Status | Positive | Negative | Total | Statistic |
|---|---|---|---|---|
| Baseline | | | | |
| N | 44 | 34 | 78 | — |
| Age, years: mean (SD) | 76.3 (6.0) | 73.3 (7.0) | 74.5 (6.6) | t = 2.21, p = 0.03 |
| Sex/gender, women: N (%) | 20 (45) | 21 (60) | 41 (52) | $\chi^2$ = 1.37, p = 0.24 |
| Race/ethnicity: N (%) | | | | $\chi^2$ = 7.29, p = 0.06 |
| White | 23 (52) | 11 (32) | 34 (44) | |
| Black | 15 (34) | 11 (32) | 26 (33) | |
| Hispanic | 4 (9) | 11 (32) | 15 (19) | |
| Other | 2 (5) | 1 (3) | 3 (4) | |
| Follow up | | | | |
| N | 14 | 0 | 14 | |
| Age, years: mean (SD) | 79.3 (6.1) | — | 79.3 (6.1) | |
| Time to follow-up, years: mean (SD) | 4.86 (1.3) | — | 4.86 (1.3) | |
| Sex/gender, women: N (%) | 8 (57) | — | 8 (57) | |
| Race/ethnicity: N (%) | | — | | |
| White | 5 (36) | — | 5 (36) | |
| Black | 5 (36) | — | 5 (36) | |
| Hispanic | 3 (21) | — | 3 (21) | |
| Other | 1 (7) | — | 1 (7) | |

Interrater reliability. A potential microbleed was labeled as a "definite" microbleed if all three raters agreed that the artifact was a microbleed, and as a "probable" microbleed if two raters agreed that it was a microbleed. There was an acceptable level of agreement between raters, with agreement ranging from 0.67-0.97 depending on rater and imaging modality. Interrater reliability did not differ systematically between SWI (0.67-0.95) and GRE (0.67-0.97). Merged ratings, reflecting the combination of SWI and GRE ratings via OR operation, i.e., if a rater labeled the location as a true positive on either SWI or GRE they counted it as a true microbleed, were also computed, and showed similar agreement range (0.70-0.95). Interrater reliability, measured across both microbleed positive and negative participants, was similar across modalities (SWI: κ=0.714, 95% CI: [0.710, 0.717]; GRE: κ=0.708, 95% CI: [0.705, 0.712]; merged: κ=0.733, 95% CI: [0.729, 0.737]) and comparable to prior studies that used visual ratings. 1 Intra-rater reliability between modalities was similar (Rater 1: κ=1.00, 95% CI: [0.994, 1.006]; Rater 2: κ=0.751, 95% CI: [0.745, 0.758]; Rater 3: κ=0.726, 95% CI: [0.720, 0.733]).

Visual ratings identified 54 locations across the 44 microbleed positive participants using SWI scans (39 definite locations, 15 probable locations). In the same 44 participants, visual ratings identified 61 locations on GRE (43 definite locations, 18 probable locations). Combining these ratings, there were a total of 64 unique locations identified (45 definite locations, 19 probable locations). These visual results were used as the "ground truth" measure of sensitivity for the algorithm.

Algorithm results-sensitivity. Of the 54 locations found on SWI, the algorithm identified 50 (38 of the definite true positives, 12 of probable true positives, 93% overall sensitivity). Of the 61 locations found on GRE, the algorithm identified 56 (41 of the definite true positives, 15 of the probable true positives, 92% overall sensitivity). Combining the ratings, the algorithm identified 61 true locations (44 of the definite true positives, 17 of the probable true positives, 95% overall sensitivity). Treated as an independent rater, the algorithm achieved a high level of agreement with other raters in marking true microbleed locations (0.75-0.89), higher than the average agreement amongst visual ratings. The full results of the algorithm's sensitivity are shown in Table 2.

TABLE 2

Algorithm sensitivity results. An artifact was labeled as a "definite" microbleed if all three raters agreed that the artifact was a microbleed, and as a "probable" microbleed if two raters agreed that it was a microbleed. This table shows the sensitivity results of the algorithm across these different labels. Note that in a study using only visual ratings, the final column (combining the definite and probable ratings) would be the number typically reported.

| | Definite | Probable | Combined |
|---|---|---|---|
| SWI | | | |
| Rater Identified | 39 | 15 | 54 |
| Algorithm Identified | 38 | 12 | 50 |
| Sensitivity | 0.97 | 0.8 | 0.93 |
| GRE | | | |
| Rater Identified | 43 | 18 | 61 |
| Algorithm Identified | 41 | 15 | 56 |
| Sensitivity | 0.95 | 0.83 | 0.92 |
| Merged | | | |
| Rater Identified | 45 | 19 | 64 |
| Algorithm Identified | 44 | 17 | 61 |
| Sensitivity | 0.98 | 0.89 | 0.95 |

Algorithm results-precision. After removing false positives using the cutoff criteria derived from the geometric measures, the algorithm identified an average of 9.7 false positives per scan (precision: 11%) on SWI images and an average of 17.1 false positives per scan (precision: 7%) on GRE images. The performance on microbleed negative participants was modestly better, with an average of 7.32 and 15.4 false positives per scan on SWI and GRE, respectively. The full results of the algorithm's precision are shown in Table 3.

TABLE 3

Algorithm precision results. As noted in the methods, microbleed positive participants are those who have at least one microbleed present (identified by two or more raters), and microbleed negative participants are those who have no microbleeds present (agreed by all three raters). False positive (FP) are presented in the final column averaged over the number of images (FP/scan).

| | True Positives | False Positives | Precision | Average FP/scan |
|---|---|---|---|---|
| Microbleed Positive | | | | |
| SWI | 50 | 426 | 0.11 | 9.7 |
| GRE | 56 | 752 | 0.07 | 17.1 |
| Microbleed Negative | | | | |
| SWI | — | 249 | — | 7.32 |
| GRE | — | 544 | — | 15.4 |
| Follow Up | | | | |
| SWI | 10 | 160 | 0.06 | 3.64 |

The measures of 3D entropy in true positive locations did not differ between SWI (average entropy: 5.85±0.41; entropy range 5.06-6.88) and GRE (average entropy: 5.79±0.38; entropy range: 5.07-6.88). As hypothesized, the 3D entropy of false positives was higher than the distribution of true positive locations in both SWI (average entropy: 6.74±0.58, $p<0.001$) and GRE (average entropy: 6.63±0.57, $p<0.001$) images. In parallel with these results, the 2D entropy of the maximum intensity projections was lower in true positive locations (SWI average entropy: 5.01±0.33; GRE average entropy: 5.01±0.31) than in false positive locations (SWI average entropy: 5.87±0.66, $p<0.001$; GRE average entropy: 5.67±0.62, $p<0.001$). In SWI images, the 2D entropy provided a more sensitive discriminant between true and false positives (2D eliminates 35.9 false positives per scan, 3D eliminates 24.5 false positives per scan), while in GRE the 2D and 3D entropy provided roughly the same level of discrimination (19.8 and 19.9 false positives per scan eliminated by 2D and 3D, respectively). Nearly all of the eliminated false positives had an entropy higher than the range of true positives, with the few that fall below the range lying in locations near a larger signal void, e.g., infarct, that would be visually rated as too large to be a microbleed. The relative distributions of 3D and 2D entropy are shown illustrated in FIGS. 5A-5H (5A and 5B show 3D and 2D entropy, respectively, in SWI, with 5E and 5F illustrating the same in GRE).

As expected, lower values of the Frangi filter cutoff allowed for generally better discrimination between true and false positives likely due to the relatively low vesselness of the structures measured. At the cutoffs selected to maximize difference between false positives larger than true microbleeds (SWI: 0.15; GRE: 0.25), true positive volume was lower on average than the volume of false positives on both SWI (true positive (voxels): 1245±475; false positive: 3003±1794; $p<0.001$) and GRE (true positive: 54±414; false positive: 2060±1287; $p<0.001$). Volume cutoffs were useful in eliminating several false positives, on both SWI (minimum: 11.8 false positives per scan eliminated; maximum: 26.5 false positives per scan eliminated) and GRE (minimum: 1.4 false positives per scan; maximum: 24.3 false positives per scan eliminated). In parallel with these results, compactness was lower in true positives (SWI: 540±414; GRE: 456±309) than in false positives (SWI: 2060±1287, $p<0.001$; GRE: 884±697, $p<0.001$). Because the extreme volume difference between true positive and false positive results drove this relationship, compactness did not provide greater discrimination ability beyond volume, contrary to our initial hypothesis. These results are illustrated in FIGS. 5A-5H (5C and 5D illustrate ROI size and compactness, respectively, in SWI, with 5G and 5H illustrating the same measures in GRE).

Figure 6:
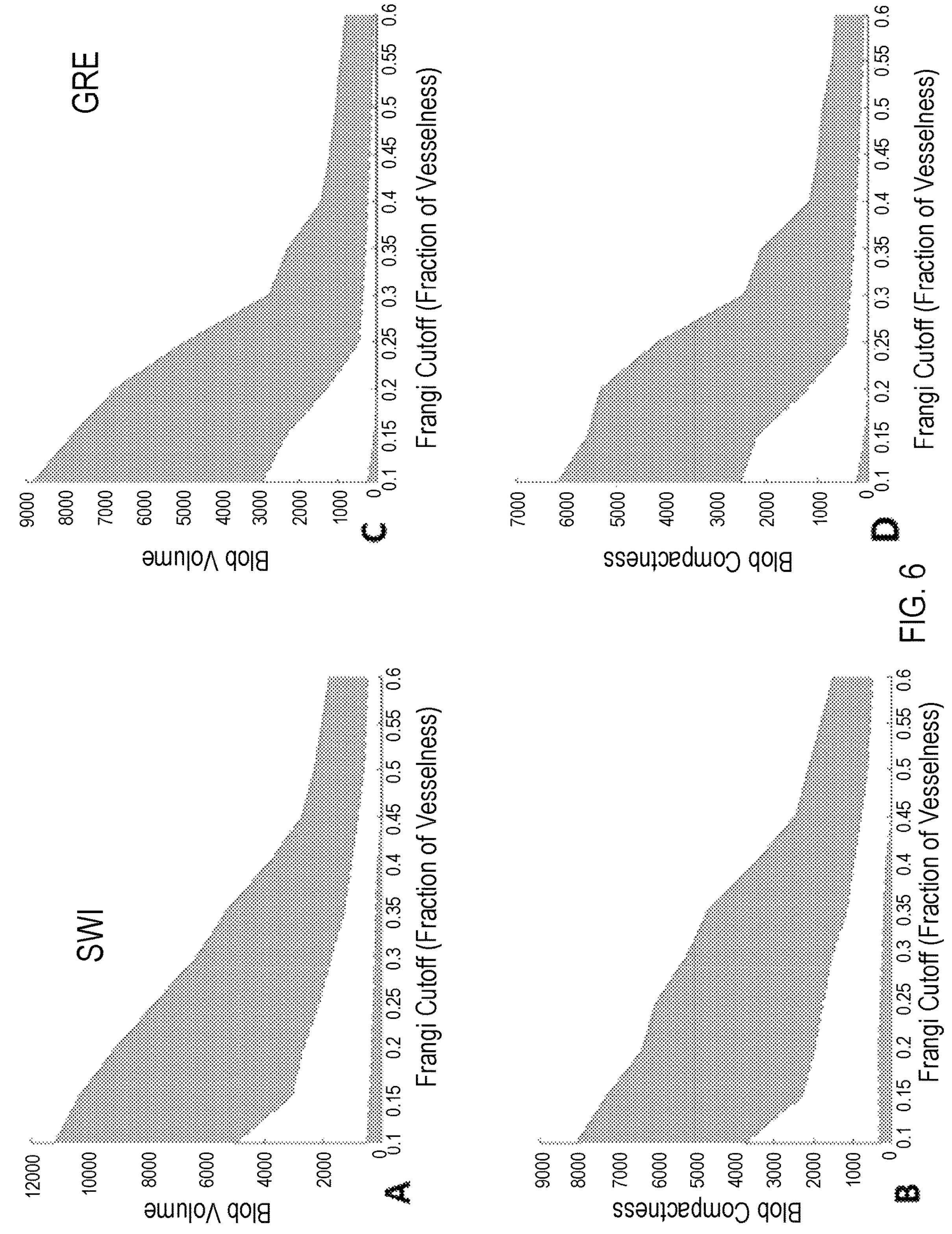
FIG. 6 is a graph portraying Frangi-filter threshold effect on blob size and compactness related to cerebral microbleed detection according to some embodiments of the present disclosure.

FIG. 6 presents a visual summary of how volume and compactness change across different values of Frangi filter cutoffs. The top row (graphs A and C, illustrating SWI and GRE, respectively) demonstrates that while true positive volume was lower than most false positive volumes (the shaded grey region), these differences were heightened in lower cutoffs for the Frangi filter, indicating that these values provide a greater level of discrimination between true and false positive locations. The bottom row (graphs B and D, again SWI and GRE, respectively) show the same pattern in compactness across Frangi filter cutoff. The cutoff values were chosen to maximize the difference between true and false positives (the shaded grey area), providing the greatest level of precision.

It is interesting to note that for the maximum cutoffs, which are responsible for more false positive eliminations than the minimum cutoffs, a cutoff of 0.25 could be used on both SWI and GRE to simplify implementation.

Final counting and location step. A random sample of 20 SWI scans from WHICAP (different from the ones used to develop the algorithm) was used to test the speed of visual ratings versus the editing of locations identified by the algorithm. The time to rate a group of 10 scans visually (no algorithm masks) was 6.12±1.58 minutes (mean±standard deviation). The time to rate a group of 10 scans with the algorithm mask was 3.48±1.81 minutes, significantly ($t(17.6)=3.50$, $p=0.003$) reducing the time to rate scans by 43%.

Nearly all (92%) of the microbleeds in this sample occurred in lobar locations (frontal: 42%, temporal: 18%, parietal: 26%, and occipital: 6%). Microbleeds lying within deeper brain structures accounted for the remainder (basal ganglia: 4%, cerebellum: 4%).

Longitudinal results. In the 14 participants who had longitudinal scans available, there were 20 potential true microbleed locations identified at baseline. In the longitudinal scans, visual ratings identified a subset of these locations remaining (rater #2 identified 6 locations; rater #3 identified 5 locations), while the algorithm identified 10 of the original locations on the follow-up scans, greatly outperforming the visual ratings in terms of longitudinal reliability. Applying the cutoffs defined at baseline to the longitudinal dataset did not remove any of the true positives and resulted in a similar level of precision to the baseline SWI (3.6 false positives per scan; 5.9% precision), indicating that the cutoffs derived using only the baseline data were applicable across multiple timepoints.

EXAMPLE 2

Participants were selected from an ongoing longitudinal study of cognitive aging in racially and ethnically diverse community-dwelling older adults. Participants without dementia underwent SWI and GRE MRI scans on a 3 T Philips Intera scanner. Microbleeds were visually rated on SWI sequences and confirmed on GRE sequences. To automate this process, a two-step pipeline was designed that included 1) automatic detection of potential microbleed locations, i.e., small, approximately circular regions, and 2) removal of false positive labels by trained raters. The images were resampled to increase the resolution, then slice-wise Canny edge detection was performed. A circular Hough transform was then used to highlight circular ROIs that were approximately the size of microbleeds as visualized on the SWI images. These ROIs were then censored for size (to remove edge artifacts) and for location (circular ROIs within the CSF are vessels, not microbleeds). Any ROIs that overlapped across slices were binned together, and a final output image was created with highlighted locations. Output images were then inspected for comparison to the manual ratings, and a user interface was implemented to easily remove false positives.

Figure 7:
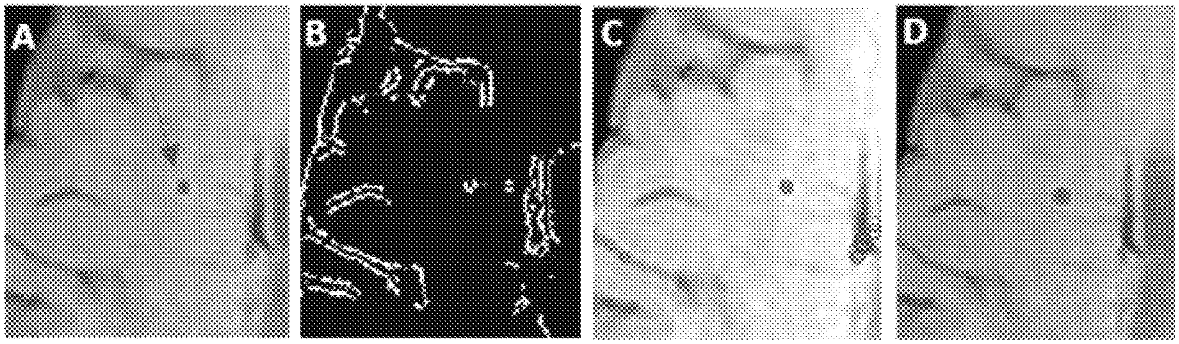
FIG. 7 is an image portraying the use of systems and methods according to some embodiments of the present disclosure for cerebral microbleed detection.

In the 64 subjects rated, 90 microbleeds were identified by trained raters. The automated detection algorithm identified 78 of these 90 locations on the SWI images acquired, with an additional 2980 locations identified across the 64 subjects as potential microbleeds (86.7% sensitivity, 2.6% precision, with an average of 48 potential microbleed locations labeled per brain). Including GRE locations identified by the algorithm (analogous to the visual secondary confirmation using GRE), an additional four microbleeds were identified, bringing the merged sensitivity to 91.1%. The eight microbleeds identified by human raters missed by the algorithm were typically larger and more irregularly shaped, making them easy to identify visually but failing the standard criteria for microbleeds (small and relatively spherical). FIG. 7 shows an illustration of steps in the pipeline used to detect microbleeds automatically.

Methods and systems of the present disclosure are advantageous to provide automated microbleed detection, e.g., on GRE and SWI images. In a community-based cohort of older adults, the systems and methods were shown to be highly sensitive (greater than 92% of all microbleeds accurately detected) across both modalities, with reasonable precision (fewer than 20 and 10 false positives per scan on GRE and SWI, respectively). The algorithms described above can be used to identify microbleeds over longitudinal scans with a higher level of sensitivity than visual ratings (50% of longitudinal microbleeds correctly labeled by the algorithm, while manual ratings was 30% or lower). Further, the algorithms identify the anatomical localization of microbleeds based on brain atlases, and greatly reduces time spent completing visual ratings (43% reduction in visual rating time). The automatic microbleed detection systems and methods are ideal for implementation in large-scale studies that include cross-sectional and longitudinal scanning, as well as being capable of performing well across multiple commonly used MRI modalities. The strengths of our algorithm include the simple approach that corresponds to visual ratings, while also standardizing the measurements and reducing interrater variability.

Embodiments of the systems and methods of the present disclosure are aimed at creating a semi-automated pipeline for the detection of cerebral microbleeds. Visual ratings, the current standard used in detecting microbleeds, are subject to variability across raters and are time consuming to complete. The embodiments presented here are efficient, easy to use, and create a reliable baseline standard across raters. The systems and methods are capable of working on multiple sequences, and so are clinically applicable in a wider range of use cases. The algorithms can provide a common baseline for all raters to work from, and is designed to especially remove any locations that are vessels, one of the more difficult ratings for the eye to detect. Additionally, the algorithm provides a faster approach than pure visual rating, as it focuses the raters attention on that are probable to be microbleeds, relieving them from visually inspecting the entire brain. Most importantly, the algorithm is sensitive across both GRE and SWI imaging sequences, making it useful in a wide range of clinical and research applications. Previous work in the industry relied on methodology that limits them to use on GRE sequences, as the microbleeds must be relatively spherical.

The locations identified show a high sensitivity, and can be output for visual confirmation by a trained rater. However, since the high specificity comes at a cost of reduced precision, the algorithm is extended to remove false positive locations from the identified mask. To remove false positive locations from the image, the noisy nature of the false positive locations is relied on to assist in separating them from the true microbleeds.

Systems and methods of the present disclosure incorporate the circular Hough transform and an automated application of the criteria used to visually rate the microbleeds as compared with radial symmetry transform, which has been found to be both less sensitive and less specific than the method we have presented here. These embodiments could be of interest to companies that offer software packages aimed at assisting clinicians in quickly, reliably, and automatically evaluating cerebrovascular abnormalities observed on MRI. The software could be implemented to assess inclusion/exclusion criteria for clinical trials, for evaluating adverse events from certain medications, and for diagnostic purposes.

Aside from the demonstrated ability of the systems and methods of the present disclosure to work across multiple modalities as well as longitudinal identification of microbleeds, the interpretability of all these steps provide an attractive additional feature. In comparison to other proposed solutions that sacrifice interpretability, e.g., machine-learning based approaches, such as convolutional neural networks (which do not offer an interpretable set of features), the geometric measures of the present disclosure correspond well with the criteria used for visual rating, and the cutoff values can be easily modified to accommodate different acquisition parameters used by different groups. The systems and methods of the present disclosure operate with comparable sensitivity and precision on both SWI and GRE scans, allowing for use across many different clinical and research applications. Additionally, there is no need to compute a high dimensional set of geometric features and select by weight, as proposed in certain random forest implementations. By maintaining interpretable geometric methods throughout the algorithm, it is easier to adapt the pipeline to study or scanner specific differences on the basis of a few experimental scans, rather than requiring retraining for each site or training on a very large initial sample set. As such, the systems and methods of the present disclosure are particularly suited, in some embodiments, to examine the presentation and pathogenesis of cerebrovascular disease in the individual patient, the patient population as a whole, subgroups thereof poised to benefit from a greater understanding of such disease, e.g., Alzheimer's disease in adults with Down syndrome.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 102B may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A method for cerebral microbleed detection, the method comprising:

acquiring, by a preprocessor module, magnetic resonance imaging (MRI) image data, the MRI image data comprising T1-weighted MRI image data and acquired T2*-weighted image data;

extracting, by the preprocessor module, extracted T2*-weighted image data from the acquired T2*-weighted image data, the extracted T2*-weighted image data corresponding to gradient echo (GRE) image data or susceptibility-weighted imaging (SWI) image data;

resampling, by the preprocessor module, the extracted T2*-weighted image data to a relatively higher resolution to yield resampled image data, the resampled image data comprising a plurality of slices;

identifying, by a detection module, each potential microbleed location in each slice of the resampled image data based, at least in part, on a respective intensity of each of a plurality of resampled image pixels, each potential microbleed location corresponding to a potential region of interest (ROI) and having a circular or ellipsoidal shape to within a shape tolerance;

reducing, by the detection module, a number of potential ROIs based, at least in part on at least one reduction criterion to yield a reduced number of potential two-dimensional (2D) ROIs;

merging, by the detection module, the reduced number of 2D ROIs into at least one merged potential three dimensional (3D) ROI, the merging performed between a plurality of adjacent slices;

defining, by the detection module, a standardized potential 3D ROI for each merged potential 3D ROI, each standardized potential 3D ROI having a respective 3D center and a surrounding neighborhood having a common size;

removing, by a 3D geometric filtering module, each potential false positive 3D ROI from the at least one standardized potential 3D ROI based, at least in part, on at least one 3D ROI characteristic of each standardized potential 3D ROI, to yield a number of final potential 3D ROIs; and storing, by a final module, each of the final potential 3D ROIs comprising a location and a volume, associated with the extracted T2*-weighted image data, for review by a trained rater.

2. The method of claim 1, further comprising:

co-registering, by the preprocessor module, the T1-weighted MRI image data and an atlas-based lobar mask to the resampled image data to generate co-registered image data; and determining, by the preprocessor module, a cerebrospinal fluid (CSF) mask based, at least in part, on a co-registered T1-weighted image data.

3. The method of claim 1, wherein the identifying each potential microbleed location comprises determining a 2D image gradient, detecting each edge pixel, applying hysteresis thresholding, and detecting each potential ROI having the circular or ellipsoidal shape.

4. The method of claim 3, wherein determining the 2D image gradient is performed using a Sobel filter, each edge pixel is detected using Canny edge detection, and each potential ROI having the circular or ellipsoidal shape is detected using a Hough transform.

5. The method of claim 1, wherein the at least one reduction criterion includes discarding each potential ROI positioned on an edge of an image, merging a plurality of overlapping ROIs, excluding each ROI having a size greater than a threshold size, excluding each singular ROI, and excluding each ROI that overlaps a cerebrospinal fluid (CSF) mask.

6. The method of claim 1, wherein removing each potential false positive 3D ROI from the at least one standardized potential 3D ROI comprises determining a vesselness of all voxels contained within each standardized potential 3D ROI.

7. The method of claim 1, wherein the 3D ROI characteristic includes a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof.

8. The method of claim 7, wherein the volume and compactness of the central blob are determined based, at least in part, on Frangi filtering.

9. The method of claim 1, further comprising determining, by the final module, a number of identified microbleeds, and generating, by the final module, a distribution of locations using a co-registered lobar mask.

10. A system for cerebral microbleed detection, the system comprising:

a computing device comprising a processor, a memory, input/output circuitry, and a data store;

a preprocessor module configured to acquire magnetic resonance imaging (MRI) image data, the MRI image data comprising T1-weighted MRI image data and acquired T2*-weighted image data;

the preprocessor module further configured to extract extracted T2*-weighted image data from the acquired T2*-weighted image data, the extracted T2*-weighted image data corresponding to gradient echo (GRE) image data or susceptibility-weighted imaging (SWI) image data;

the preprocessor module further configured to resample the extracted T2*-weighted image data to a relatively higher resolution to yield resampled image data, the resampled image data comprising a plurality of slices;

a detection module configured to identify each potential microbleed location in each slice of the resampled image data based, at least in part, on a respective intensity of each of a plurality of resampled image pixels, each potential microbleed location corresponding to a potential region of interest (ROI) and having a circular or ellipsoidal shape to within a shape tolerance;

the detection module further configured to reduce a number of potential ROIs based, at least in part on at least one reduction criterion to yield a reduced number of potential two-dimensional (2D) ROIs;

the detection module further configured to merge the reduced number of 2D ROIs into at least one merged potential three dimensional (3D) ROI, the merging performed between a plurality of adjacent slices;

the detection module further configured to define a standardized potential 3D ROI for each merged potential 3D ROI, each standardized potential 3D ROI having a respective 3D center and a surrounding neighborhood having a common size;

a 3D geometric filtering module configured to remove each potential false positive 3D ROI from the at least one standardized potential 3D ROI based, at least in part, on at least one 3D ROI characteristic of each standardized potential 3D ROI, to yield a number of final potential 3D ROIs; and a final module configured to store each of the final potential 3D ROIs comprising a location and a volume, associated with the extracted T2*-weighted image data, for review by a trained rater.

11. The system of claim 10, wherein the preprocessor module is configured to co-register the T1-weighted MRI image data and an atlas-based lobar mask to the resampled image data to generate co-registered image data; and to determine a cerebrospinal fluid (CSF) mask based, at least in part, on a co-registered T1-weighted image data.

12. The system of claim 10, wherein removing each potential false positive 3D ROI from the at least one standardized potential 3D ROI comprises determining a vesselness of all voxels contained within each standardized potential 3D ROI.

13. The system of claim 10, wherein the 3D ROI characteristic includes a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof.

14. The system of claim 10, wherein the final module is configured to determine a number of identified microbleeds, and to generate a distribution of locations using a co-registered lobar mask.

15. A computer readable storage device having stored thereon instructions that when executed by one or more processors result in the following operations comprising:

acquiring magnetic resonance imaging (MRI) image data, the MRI image data comprising T1-weighted MRI image data and acquired T2*-weighted image data;

extracting extracted T2*-weighted image data from the acquired T2*-weighted image data, the extracted T2*-weighted image data corresponding to gradient echo (GRE) image data or susceptibility-weighted imaging (SWI) image data;

resampling the extracted T2*-weighted image data to a relatively higher resolution to yield resampled image data, the resampled image data comprising a plurality of slices;

identifying each potential microbleed location in each slice of the resampled image data based, at least in part, on a respective intensity of each of a plurality of resampled image pixels, each potential microbleed location corresponding to a potential region of interest (ROI) and having a circular or ellipsoidal shape to within a shape tolerance;

reducing a number of potential ROIs based, at least in part on at least one reduction criterion to yield a reduced number of potential two-dimensional (2D) ROIs;

merging the reduced number of 2D ROIs into at least one merged potential three dimensional (3D) ROI, the merging performed between a plurality of adjacent slices;

defining a standardized potential 3D ROI for each merged potential 3D ROI, each standardized potential 3D ROI having a respective 3D center and a surrounding neighborhood having a common size;

removing each potential false positive 3D ROI from the at least one standardized potential 3D ROI based, at least in part, on at least one 3D ROI characteristic of each standardized potential 3D ROI, to yield a number of final potential 3D ROIs; and storing each of the final potential 3D ROIs comprising a location and a volume, associated with the extracted T2*-weighted image data, for review by a trained rater.

16. The device of claim 15, wherein the instructions stored thereon that when executed by one or more processors result in the following operations comprising:

co-registering the T1-weighted MRI image data and an atlas-based lobar mask to the resampled image data to generate co-registered image data; and determining a cerebrospinal fluid (CSF) mask based, at least in part, on a co-registered T1-weighted image data.

17. The device of claim 15, wherein the at least one reduction criterion includes discarding each potential ROI positioned on an edge of an image, merging a plurality of overlapping ROIs, excluding each ROI having a size greater than a threshold size, excluding each singular ROI, and excluding each ROI that overlaps a cerebrospinal fluid (CSF) mask.

18. The device of claim 15, wherein removing each potential false positive 3D ROI from the at least one standardized potential 3D ROI comprises determining a vesselness of all voxels contained within each standardized potential 3D ROI.

19. The device of claim 15, wherein the 3D ROI characteristic includes a 3D image entropy of a selected standardized potential 3D ROI, a 2D image entropy of a maximum intensity projection of the selected standardized potential 3D ROI, a volume of a central blob of the selected standardized potential 3D ROI, a compactness of the central blob of the selected standardized potential 3D ROI, or combinations thereof.

20. The device of claim 15, wherein the instructions stored thereon that when executed by one or more processors result in the following operations comprising: determining a number of identified microbleeds; and generating a distribution of locations using a co-registered lobar mask.

* * * * *